United States Patent
Gupta et al.

(10) Patent No.: US 12,531,873 B2
(45) Date of Patent: Jan. 20, 2026

(54) COHORT AFFINITY GROUPING FOR ACCESS CONTROL

(71) Applicant: Live Nation Entertainment, Inc., Beverly Hills, CA (US)

(72) Inventors: Ashish Ravindra Gupta, Los Angeles, CA (US); Joseph Paul Aiello, Old Hickory, TN (US)

(73) Assignee: Live Nation Entertainment, Inc., Beverly Hills, CA (US)

(*) Notice: Subject to any disclaimer, the term of this patent is extended or adjusted under 35 U.S.C. 154(b) by 64 days.

(21) Appl. No.: 18/669,116

(22) Filed: May 20, 2024

(65) Prior Publication Data

US 2024/0388588 A1    Nov. 21, 2024

Related U.S. Application Data

(60) Provisional application No. 63/503,155, filed on May 18, 2023.

(51) Int. Cl.
*H04L 9/40* (2022.01)
(52) U.S. Cl.
CPC .................................. *H04L 63/104* (2013.01)
(58) Field of Classification Search
CPC ....... G06Q 10/02; G06Q 50/01; H04L 63/104
See application file for complete search history.

(56) References Cited

U.S. PATENT DOCUMENTS

| | | | |
|---|---|---|---|
| 2012/0252418 A1* | 10/2012 | Kandekar | H04W 4/029 455/414.1 |
| 2013/0212494 A1* | 8/2013 | Heiferman | H04L 12/1818 715/753 |
| 2014/0089017 A1 | 3/2014 | Klappert et al. | |
| 2015/0026083 A1* | 1/2015 | Paliwal | G06Q 10/00 705/319 |
| 2015/0120341 A1 | 4/2015 | Scarborough | |
| 2015/0154516 A1 | 6/2015 | Joachim | |
| 2015/0172853 A1* | 6/2015 | Liu | H04W 4/02 709/204 |
| 2017/0132723 A1* | 5/2017 | Kim | G06Q 50/01 |
| 2019/0236106 A1* | 8/2019 | Zhang | G06N 20/00 |
| 2021/0174268 A1* | 6/2021 | Levinson | G06Q 50/10 |
| 2024/0135285 A1* | 4/2024 | Wozniak | G06N 3/088 |

* cited by examiner

*Primary Examiner* — Gil H. Lee
(74) *Attorney, Agent, or Firm* — MUGHAL GAUDRY & FRANKLIN PC

(57) ABSTRACT

A system that facilitates access control at venues through cohort affinity grouping. It verifies users' authenticity by comparing credentials stored in a database, then identifies related users based on social graph data, such as past attendance and social media activity. By determining correlation values among users, it forms cohorts associated with the venue's resources. Users select and join cohorts, and access rights are transmitted accordingly. A smart queue system triggers notifications for check-in, optimizing the process based on predefined intervals. Any member's check-in request triggers check-in for the entire cohort, streamlining entry. The system assigns queue numbers and notifies users of seating arrangements, fostering a cohesive user experience.

20 Claims, 24 Drawing Sheets

COHORT AFFINITY GROUPING FOR ACCESS CONTROL

PRIORITY

This application is a non-provisional of and claims priority to Provisional Application No. 63/503,155 filed on May 18, 2023, which is incorporated herein by reference for all purposes.

A portion of the disclosure of this patent document contains material, which is subject to copyright and/or mask work protection. The copyright and/or mask work owner has no objection to the facsimile reproduction by anyone of the patent document or the patent disclosure, as it appears in the Patent and Trademark Office patent file or records, but otherwise reserves all copyright and/or mask work rights whatsoever.

BACKGROUND

This disclosure relates in general to allocating access rights for a live event inside a venue. Events inside venues have happened since the beginning of time. Attending live events such as concerts, sports games, or theatre performances has become a popular pastime for people worldwide. However, the traditional process of physically checking-in to these events can be a challenging and time-consuming task. Often, event attendees have to queue up for hours, which can be exhausting and tiring, especially when the event is in high demand. Moreover, the traditional access rights allocation process may not guarantee that attendees get their preferred seating arrangements, causing dissatisfaction.

In recent years, technological advancements have simplified the check-in process and improve the overall experience for event attendees. Mobile booking of access rights allocation, for example, has emerged as a popular alternative to traditional paper access rights, allowing attendees to purchase access rights online and have them delivered directly to their smartphones. However, even with mobile access rights allocation, attendees still have to go through the time-consuming process of physically checking-in to the event. Therefore, there is an exigence for an efficient and user-friendly method to check-in to live events that would simplify the process for attendees and improve their overall experience.

SUMMARY

In one embodiment, the present disclosure provides one or more techniques that aims to eliminate the drawbacks of the traditional check-in process by introducing a new system to streamline the check-in process and to ensure that the attendees get their preferred seating arrangements without the need for physical check-in.

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure described herein relate to a system and method that facilitates cohort affinity grouping for access control at venues. The system comprises at least one processor responsible for various operations. Initially, it receives requests for access rights from user devices and authenticates users by comparing their credentials with pre-stored data in a database. Upon successful verification, access rights are assigned to users.

Furthermore, the system identifies additional users, such as a second and third user, by analyzing the social graph data of the first user. This data encompasses various parameters like past attendance, social media activity, and interactions, aiding in establishing correlations among users. Based on these correlations, the system populates and displays multiple cohorts associated with the resource.

In addition, users then select cohorts of interest, and the system transmits access rights availability to corresponding user devices. Following selection and confirmation, access rights are allocated to users, including the second and third users. Additionally, the system enhances the check-in process by enabling smart queues and triggering notifications for check-in availability within the venue.

Moreover, the system assigns queue numbers to cohort members, streamlining the check-in process and ensuring efficient seating arrangements. To bolster security and authentication, the system verifies user authenticity by comparing attributes stored in the database, such as index values and fan scores. It utilizes machine learning algorithms to calculate cohort index values and determine the genuineness of users, facilitating priority booking for verified users.

Furthermore, the system continually updates its machine learning models with new data, ensuring accuracy and reliability over time. Additionally, it evaluates users' social graph data against predefined thresholds, guiding them to appropriate actions based on the analysis. These implementations span hardware, methods, and computer software, offering a comprehensive solution for access control and cohort management at venues.

Moreover, the systems and methods that enhance and efficiently implement group check-in process for events. One embodiment of the present disclosure relate to a system for access rights booking and enabling group check-in. The system also includes a processor configured to identify availability of access rights for an event and a receiving module configured to receive a request for access rights booking from a plurality of users. In some configurations, the system also includes a booking module configured to confirm access rights booking followed by a grouping module to introduce a plurality of groups based on user attributes. Further, the system also includes a user interface module configured to receive input from at least one user for joining at least one group. Moreover, the system also includes a triggering module configured to trigger check-in by at least one group member and a check-in module configured to enable all the group members to check-in for the event simultaneously. Other embodiments of this aspect include corresponding computer systems, apparatus, and computer programs recorded on one or more computer storage devices, each configured to perform the actions of the methods.

Furthermore, one general aspect includes a system for facilitating access rights booking and group check-in. The system also includes a memory for storing cohort index values associated with groups of users and a predefined threshold value and a processor for comparing the group index value of a group associated with a user to the predefined threshold value, and if the group index value is greater than the threshold value, enabling a smart queue for all group members associated with the group. In some instances, the system also includes an access rights booking module for facilitating prioritized access rights booking and check-in for the group members associated with the enabled smart queue at the event.

In one exemplary embodiment, a system of one or more computers is configured to execute specific operations through software, firmware, or hardware. This includes a method for facilitating group check-in using a machine learning model. Initially, the system receives user input for group enrolment and then verifies user authenticity by comparing attributes with stored data and employing a machine learning model. Upon successful authentication, membership is granted, while bot users are flagged and denied access.

Further, in one exemplary embodiment, the method also involves determining genuine users by evaluating increases in cohort index values after user inclusion. Genuine users are then granted priority booking features, such as expedited check-in and early access to resources. To maintain eligibility, the system periodically re-evaluates cohort index values using the machine learning model, adjusting weights and predicting changes in group dynamics.

Beyond the method, the system can adapt predictions based on user-provided data, update the machine learning model with historical information, and refine authentication outcomes. This comprehensive approach ensures efficient and secure group check-in for events. Additionally, corresponding computer systems, apparatus, and programs are provided to support these functionalities.

In one exemplary embodiment, the community groups are created with an initial group index value. This initial group index value might be system default value or calculated based on the number of members added initially, and the fan following of the group members.

Furthermore, the system also includes a user interface for presenting access rights availability, cohort index values, and smart queue status to users. Other embodiments of this aspect include corresponding computer systems, apparatus, and computer programs recorded on one or more computer storage devices, each configured to perform the actions of the methods.

Certain aspects and features of the present disclosure relate to a device for enabling group check-in to users. The device also includes a user interface for receiving user input and a processor configured to identify user attributes, including index value, interest, location, etc., and to populate a plurality of groups based on the user attributes. In some configurations, the device also includes a database storing user information for authentication and a verification module configured to compare the user attributes with information stored in the database to verify the authenticity of a user associated with the device. In some instances, the device also includes a membership allocation module configured to allocate membership to the user in a specified group based on successful authentication and to indicate the user as a robot user and block membership in the specified group based on unsuccessful authentication. Other embodiments of this aspect include corresponding computer systems, apparatus, and computer programs recorded on one or more computer storage devices, each configured to perform the actions of the methods.

Certain aspects and features of the present disclosure relate to a method for enabling group check-in to users. In one exemplary embodiment, the method also includes receiving an input on a user interface for joining at least one group and verifying authenticity of a user associated with a device based on comparing user attributes with information stored in a database. In addition, the method also includes allocating membership to the user in the specified group based on successful authentication and indicating the user as a robot user and blocking membership in the specified group based on unsuccessful authentication. Furthermore, the method also includes determining an increase in group index value after adding the user in the specified group. In addition, the method also includes determining that a newly added user is a genuine user based on a determination that the group index value is more than an initial group index value. Other embodiments of this aspect include corresponding computer systems, apparatus, and computer programs recorded on one or more computer storage devices, each configured to perform the actions of the methods.

One general aspect includes a method for access rights booking and group check-in. The method also includes receiving an input for joining at least one group via a user interface. The method also includes determining whether the input is raised by a new user or an existing user based on a comparison of user attributes with information stored in a database. In some configurations, the method also includes if the input is raised by a new user, prompting a quiz on the new user device that is time-bound and determining that the new user is a genuine user based on a comparison of the quiz score with a threshold value. Furthermore, the method also includes if the input is raised by the existing user, comparing index value of the existing user with a second threshold value and determining that the existing user is the genuine user or not based on the comparison. In some instances, the method also includes adding genuine users to the group and adding bonus points to the group index value. Instead, or in addition, the method also includes recalculating group index value and enabling priority booking features for entire group members. Other embodiments of this aspect include corresponding computer systems, apparatus, and computer programs recorded on one or more computer storage devices, each configured to perform the actions of the methods.

In various embodiments, a resource (e.g., an event) may be associated with a plurality of access rights (e.g., event tickets). Each access right may grant access to a spatial area (e.g., a venue) associated with the resource for a defined period of time.

In one exemplary embodiment, joining groups provides the ability to share the experience with friends and family, which enhances the enjoyment of the event. Moreover, it allows users to split the cost of the access rights and reduces the overall expense of attending the event. Additionally, it provides an opportunity for users to meet new people and make new friends who share similar interests.

In one exemplary embodiment, the system provides efficient and accurate grouping of fans based on their attributes. The system also uses fan-related attributes to create groups, making it easier for fans to find and join groups that align with their interests. This also helps in improving the user experience and making it more personalized.

Moreover, by joining the groups, fans can connect with other fans who share similar interests, discuss events and activities, share experiences, and collaborate. Joining groups also provides fans with access to exclusive offers, discounts, and promotions. The advantages of joining groups include a more personalized and engaging experience, improved customer satisfaction, and increased brand loyalty. As another example, group check-in provides a more personalized and engaging experience for fans while improving the efficiency of the process.

Thus, in some instances, the system provides a streamlined process for access rights booking and group check-in. By automating the group check-in process, the system reduces the time and effort required for users to check-in and find seats in proximity to their group members. Moreover, by assigning a unique queue number to all group members, the system ensures that they can sit together, which enhances the overall user experience.

The advantages of joining the groups include a higher chance of getting access rights for popular events, early access to access rights, discounts on access rights prices, and priority booking. Joining groups also provides an opportunity to meet and interact with other fans of the same event, creating a more enjoyable experience for everyone involved.

Furthermore, by joining the groups, the ease of checking in and finding seats in proximity to each other increases which reduces the hassle and stress of navigating through crowds to find seats. Additionally, it allows users to enjoy the event together with their friends and family, enhancing the overall entertainment experience.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label with a second alphabetical label that distinguishes among the similar components. If only the first reference label is used in the specification, the description applies to any one of the similar components having the same first reference label irrespective of the second reference label.

DETAILED DESCRIPTION

The ensuing description provides preferred exemplary embodiment(s) only and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
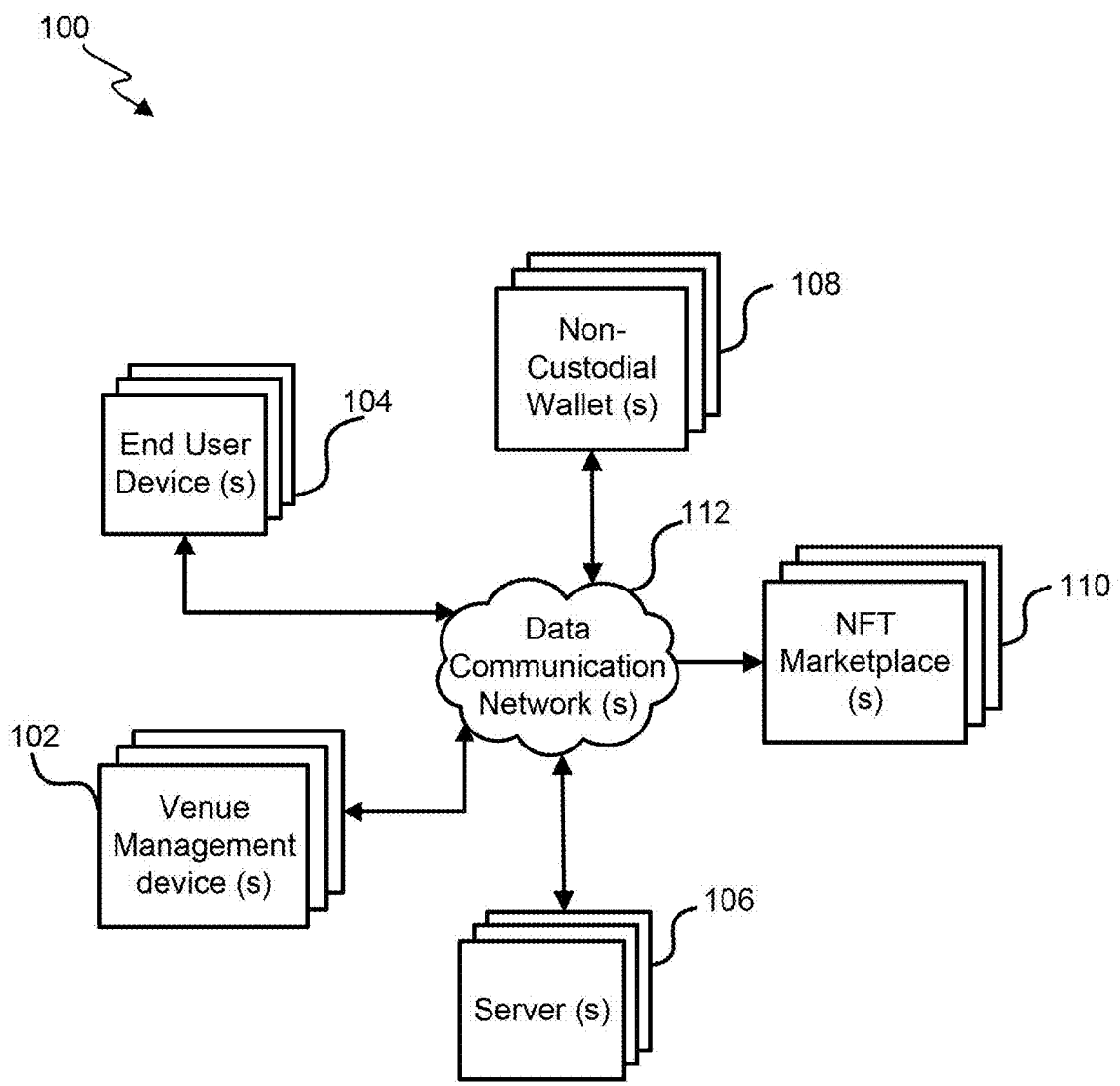
FIG. 1 illustrates a block diagram of a system according to an embodiment of the present disclosure.
Figure 2:
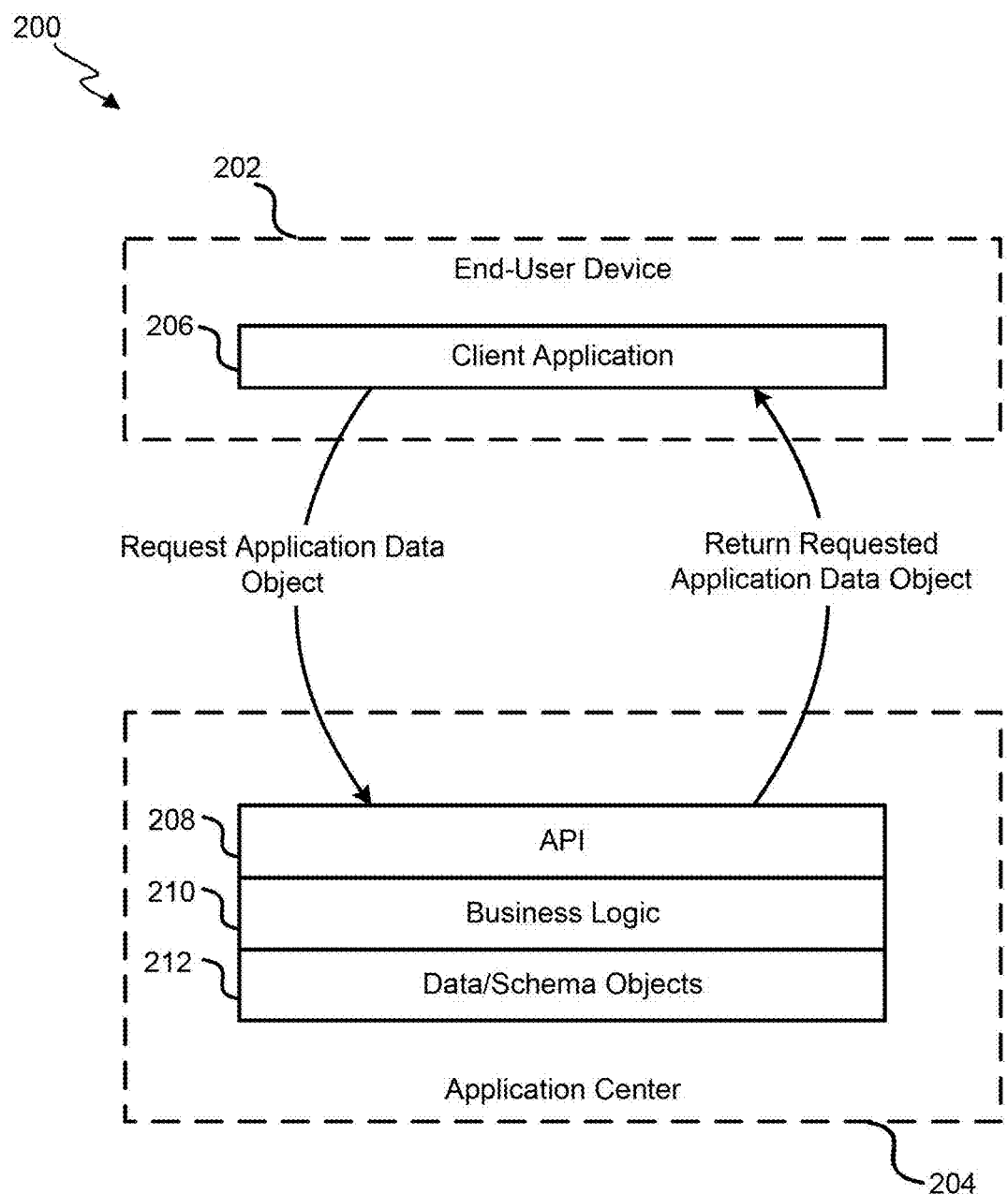
FIG. 2 illustrates a block diagram of a user device and Application interface according to an embodiment of the present disclosure.
Figure 3:
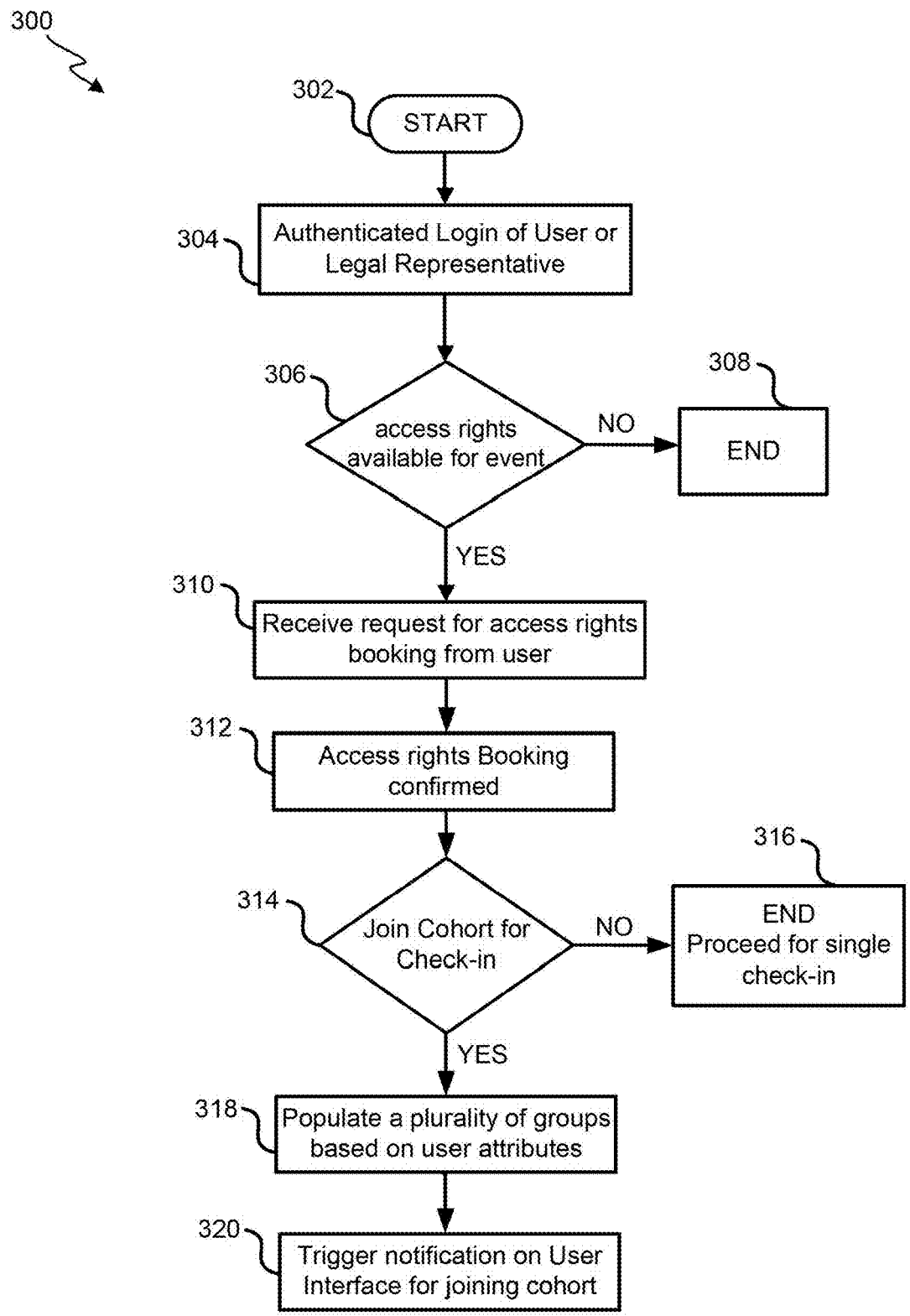
FIG. 3 illustrates a flowchart for an access rights booking and group joining process according to an embodiment of the present disclosure.

Referring to FIG. 3, illustrates a block diagram of an event management system 100, according to some embodiment of the present disclosure. The event management system 100 includes multiple venue management device(s) 102, multiple end-user device(s) 104, multiple server(s) 106, multiple non-custodial wallet(s) 108, and multiple web interfaces for a NFT (non-fungible token) marketplace 110. Different components of the event management system 100 are connected via a data communication network(s) 112. Data communication network(s) 112 can provide a wireless connection with other components.

In some configurations, the multiple venue management device(s) 102 can be operated by multiple event providers hosting a live event at a venue. The venue management device(s) 102 can generate and/or transmit event-provider communication. For example, the venue management device(s) 102 can send a communication to an event provider that indicates Location Y in New York and will host a series of periods (e.g., a series of the play Hamilton on 10 particular nights).

In one embodiment, an individual location associated with a single series of periods is identified from the event provider communication. For example, the received event provider communication indicates a location of Location Y for hosting a single series of Hamilton shows between March 2018 and April 2018.

In another embodiment, the received event provider communication can indicate multiple locations associated with multiple series of periods. For example, the received event provider communication can indicate a Location Y for hosting a series of Hamilton shows between March 2018 and April 2018 and the location Raleigh Arena in Raleigh, N.C. for hosting a series of Hamilton shows between June 2018 and July 2018. As can be seen, a series of periods can correspond to a series of events of a particular performance or show at a particular venue (e.g., location). In such an embodiment, respective performance can occur at a particular location at a particular period.

The multiple end-user device(s) 104 can be used to request the assignment of access right from the event providers. The multiple end-user device(s) 104 can be any type of computing device that is portable, e.g., smartphones, mobile phones, tablets, and/or other similar devices. Individual user (or fan) attending an event inside the venue can carry an end-user device(s) 104 with them inside the venue. Multiple activities can be performed with the help of the end-user device(s) 104, for example, but not limited, carrying the access rights in digital form for the event, entering inside the venue using the digital access rights present on the application running on end-user device(s) 104, making purchases inside the venue using the end-user device(s) 104.

The Server(s) 106 can rely on a blockchain-based computing platform that distinguishes itself from the Bitcoin blockchain by enabling "smart contract" functionality. An example of such a blockchain-based computing platform is Ethereum™. In some cases, the computing platform provides a decentralized virtual machine that executes peer-to-peer contracts using cryptocurrency. These contracts are applications that run unerringly as programmed without any possibility of downtime, censorship, fraud, or third-party interference. They can operate on this blockchain ("the blockchain"), a powerful shared global infrastructure that can move value around and represent the ownership of property. This generally enables developers to create markets, store registries of debts or promises, move funds in accordance with instructions given long in the past (like a will or a futures contract), and many other things that have not been developed yet, without a middle-man or counter-party risk.

In one exemplary embodiment, individual access rights for the venue can undergo a tokenization and securitization process, which includes the obfuscation of the barcode that is entailed for entry. The barcode can not include any identifying information of an owner of a access rights. Every access rights can have a set of principals who have different levels of access to the access rights, similar to authorization roles in operating system security (i.e., Administrators, Super Users, Users, and Guests). The access rights issuer, the access rights administrator (in this case, the party associated with the system), and the access rights owner each can have the authorization to perform various transactions on the access rights. Meanwhile, "guest" users can access information such as the access rights, including confirming ownership of the access rights to build trust in a potential transaction.

In another exemplary embodiment, individual access rights can be authenticated by access rights credentials and non-fungible tokens (NFT) which can be allocated to a user at the time of purchasing the access rights. The NFTs are exclusive and non-interchangeable units of data stored on a digital ledger (blockchain). NFTs can be associated with easily-reproducible items such as photos, videos, audio, and other types of digital files as exclusive items (analogous to a certificate of authenticity). NFTs use blockchain technology to provide public proof of ownership.

Further, a user can purchase or trade NFTs during the event. The multiple web interfaces for NFT marketplace 110 includes the NFTs available to the user for purchasing or trading NFTs. The NFTs are created by a service provider of NFT and put on NFT marketplace 110. In one embodiment, the NFTs can be created by the users attending the venue. The users can sell the NFT already present with the user on the NFT marketplace 110.

The NFTs when purchased by the users are stored in a non-custodial wallet(s) 108 present on the application running on the end-user device(s) 104 available with the users. The non-custodial wallet(s) 108 are a collection of NFTs that are owned by a specific user. The non-custodial wallet(s) 108 can be an array of references to addresses that represent each NFTs on the blockchain. The relationship is reflexive: the wallet can track the NFTs owned by the user, while the NFTs can store the user's address and authorize a set of activities for that user to do, including transferring or redeeming the access rights.

Figure 4:
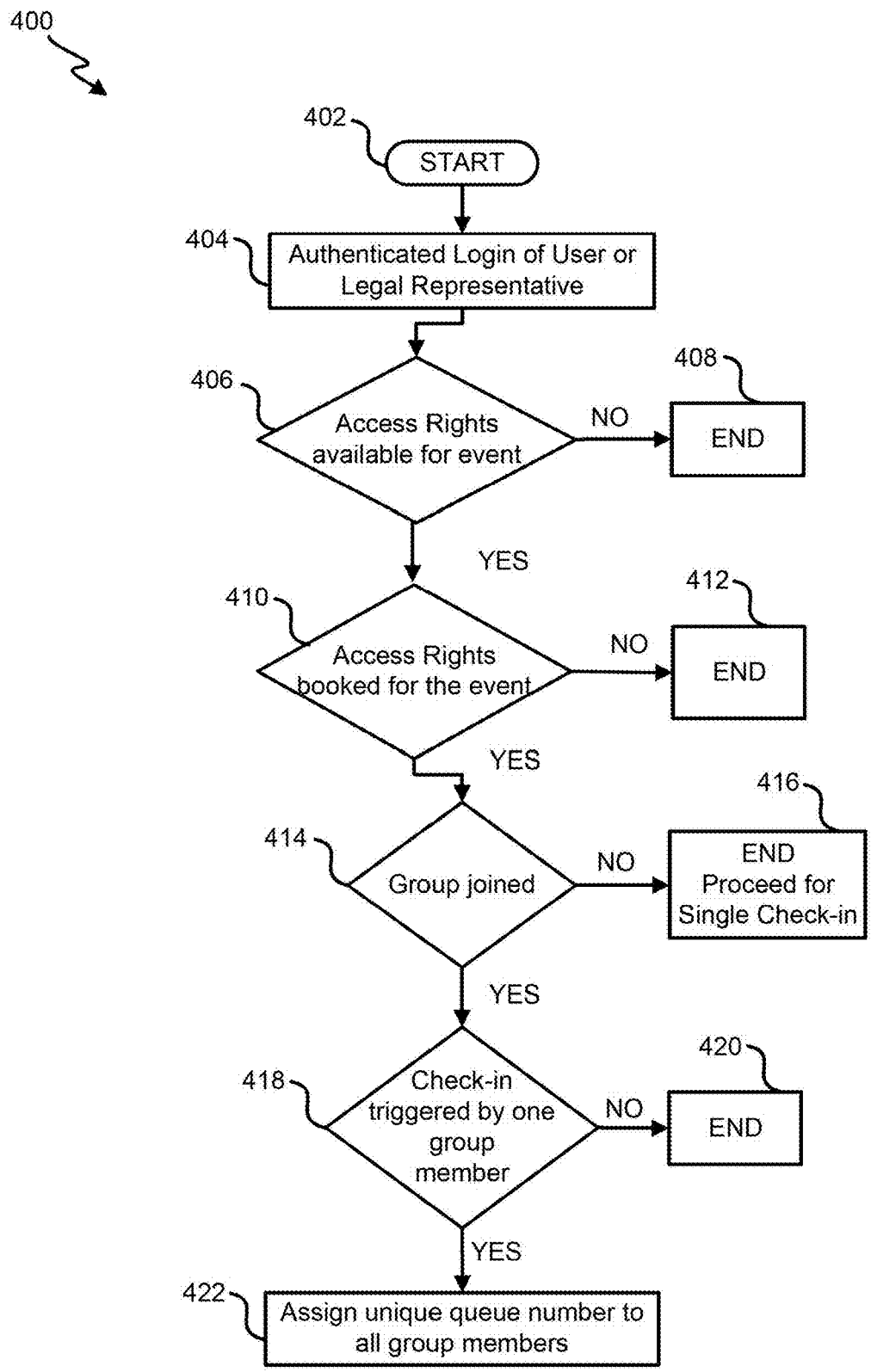
FIG. 4 illustrates a flowchart of access rights booking and group check-in according to an embodiment of the present disclosure.

Referring to FIG. 4, illustrates a block diagram 200 of a user device and an application interface, embedded with a system and/or apparatus, for access rights booking and group check-in. In one embodiment, 200 includes an end-user device 202 and an application center 204 which are communicatively coupled with one another. In some embodiments, the end-user device 202 includes a client application 206 such that the client application 206 requests application data objects from the application center 204. Further, the application center 204 includes an application program interface (API) 208, a business logic 210, and data/schema objects 212 for performing various operations on data before transmitting data back to the client application.

In some embodiments, client application 206 is downloaded from application center 204 and then installed on the end-user device 202. The client application 206, upon execution on the end-user device 202, provides various features and options for access rights booking and group check-in which are described in more detail with reference to the subsequent drawings.

Referring to FIG. 3, illustrates flowchart 300 for the access rights booking and group joining process according to an embodiment of the present disclosure. In one exemplary embodiment, FIG. 3 depicts a flowchart for the access rights booking and group joining process. The process starts at step 302 and entails authentication through login by the user or legal representative at step 304. Once authenticated, a processor embedded in the system is configured to check availability of access right for an event at step 306. If the access rights are unavailable, the system proceeds to step 308, where it indicates the unavailability of the access rights. In case, the access rights are available, a receiving module embedded with the system is configured to receive the user's request for the access rights booking at step 310. A booking module embedded with the system verifies the user's identification and payment and generates a confirmation message at step 312.

In one exemplary embodiment, after booking the access rights, a grouping module embedded with the system is configured to generate group joining options for the user at step 314. If the system does not receive any input, via a user interface module embedded with the system, from a user for not joining any group, the system proceeds to step 316, where it indicates a single check-in for the event. Further, in one exemplary embodiment, all the actions performed by different modules are adapted to be performed by the processor embedded in the system.

In yet one another exemplary embodiment, if the user chooses to join a group, the system populates a plurality of groups based on the user's attributes such as historical booking information, social media history, overall booking index value, and other similar parameters at step 318.

Finally, at step 320, a triggering module embedded with the system is configured to trigger at least one notification on the user interface of the user device, indicating the groups the user has shown interest in joining. This notification helps the user to connect and interact with other individuals or groups attending the event, enhancing their overall experience.

As described in further detail below, in some instances, joining the groups enables users to network and socialize with like-minded individuals or groups attending the event, increasing their engagement and enjoyment of the event. Moreover, joining groups can provide access to exclusive event-related content, such as backstage passes or VIP access, which is otherwise unavailable. Moreover, joining groups provides an enhanced user experience, improved event attendance, and better user engagement, leading to higher user satisfaction and loyalty.

Referring to FIG. 4, illustrates flowchart 400 of the access rights booking and group check-in process. The process starts at step 402 and proceeds to step 404, which involves authentication based on login by a user or legal representative. The next step, step 406, is a decision box indicating the availability of access right for an event. As described in further detail below, in some instances, if the access rights are unavailable, step 408 is executed, which leads to step 410 otherwise it leads to the end as illustrated by step 412. Moreover, if the access rights are available, the process proceeds to step 414, where the system generates a confirmation message on a user interface after verification of identification and payment for the access rights booking.

In some configurations, after the access rights booking process, the system proceeds to step 414, which checks whether the user's device has joined any groups. If the device has not joined any groups, step 416 is executed, and the user proceeds with a single check-in process. However, if the user device has joined groups for group check-in, the system proceeds to step 418. At this step, once the check-in window is opened, any group member can trigger a check-in, which automatically triggers check-in for all the group members. If no group member triggers check-in, the system terminates the check-in process at step 420. However, if the check-in is triggered, the system assigns a inimitable queue number to all the group members at step 422, allowing them to sit in proximity amongst one another.

In one exemplary embodiment, joining groups provides several technical benefits to users, including faster and more efficient check-in, the ability to sit together, and the opportunity to communicate with each other during the event. Moreover, joining groups also provides several advantages, including increased social interaction, enhanced experience during the event, and the ability to share the experience with friends and family. Additionally, it can save time and effort in coordinating check-in and seating arrangements for group members.

Figure 5:
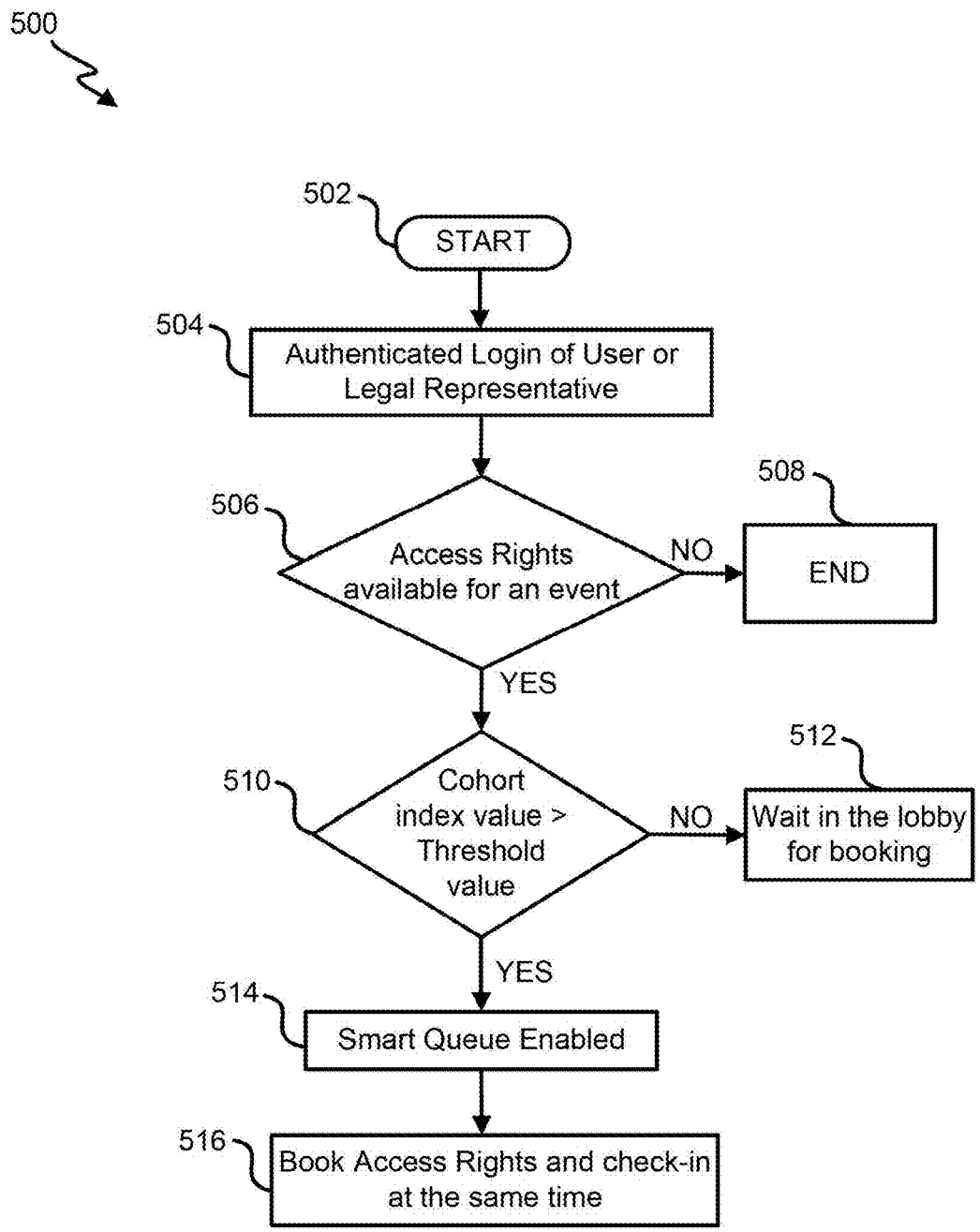
FIG. 5 illustrates a flowchart of access rights booking and group check-in according to an embodiment of the present disclosure.

Referring to FIG. 5, illustrates a flowchart 500 of access rights booking and group check-in according to an embodiment of the present disclosure. In one exemplary embodiment, the flowchart consists of several components and steps that depict the different stages of the access rights booking and group check-in process. Step 502 indicates the start of the access rights booking process, which can be initiated on a user interface of an electronic device having a access rights booking application installed in the electronic device.

The flowchart of FIG. 5 describes a structured process for access rights booking and cohort check-in. At step 502 includes the initiation of the process, facilitated through an electronic device having access rights booking application installed therein.

Further, step 504 includes authentication phase, wherein the system verifies user credentials against pre-stored data in a database. This authentication process, ensures the integrity and legitimacy of the user attempting to procure access rights. The authentication process, encompasses a comprehensive assessment of user attributes, including index value, interest, and location, reinforcing the system's capability to discern genuine users from spurious ones.

Furthermore, step 506 includes a decision point wherein in case the access rights are unavailable, step 510 pivots the process towards further evaluation, scrutinizing the cohort index value against a predefined threshold. This threshold-based evaluation mechanism, ingrained within the system's architecture, ensures optimal resource allocation and enhances user experience by streamlining access to events.

In addition, if the access rights are available, step 508 describes the seamless progression towards enabling users to procure the access rights. The dynamic allocation of cohort memberships, guided by these predictive models, enhances the system's efficacy in catering to user preferences and streamlining group check-in processes.

Furthermore, steps 512 and 514 represents the system's adaptability and responsiveness, offering tailored solutions based on the assessed cohort index value. In instances where the index value falls below the predefined threshold, step 512 directs users to a booking lobby, providing them with an avenue to await further processing. On the other hand, a higher index value triggers the activation of a smart queue at step 514, expediting the booking process and exemplifying the system's capacity to optimize resource utilization and enhance user satisfaction.

In one exemplary embodiment, One or more users can utilize the system's interface to browse available events, select preferred cohorts based on shared interests or past attendance, and seamlessly book access rights. The system's grouping algorithm could dynamically allocate users to cohorts, optimizing seating arrangements and enhancing the overall event experience. Additionally, priority booking features could be extended to genuine users, offering perks like expedited check-in and early access to the access rights.

In one another exemplary embodiment, the one or more users could use the system to join cohorts aligned with their ride preferences, enabling them to efficiently navigate the park and minimize wait times. The smart queue functionality could trigger notifications for optimized ride check-ins, ensuring seamless transitions between attractions. Moreover, the system's authentication mechanisms could enhance security measures, preventing unauthorized access to restricted areas within the park.

In one exemplary embodiment, this process can advantageously allow for providing an efficient and effective way of booking access right and checking in for live events. The smart queue ensures that users with a higher group index value are given priority in the booking process. This system helps to manage large crowds and prevent overcrowding at live events. In addition, joining the groups include early access to the access rights, priority booking, and the ability to interact with other fans of the same group. Moreover, joining groups also provides a sense of community and belongingness for fans of live events.

Figure 6:
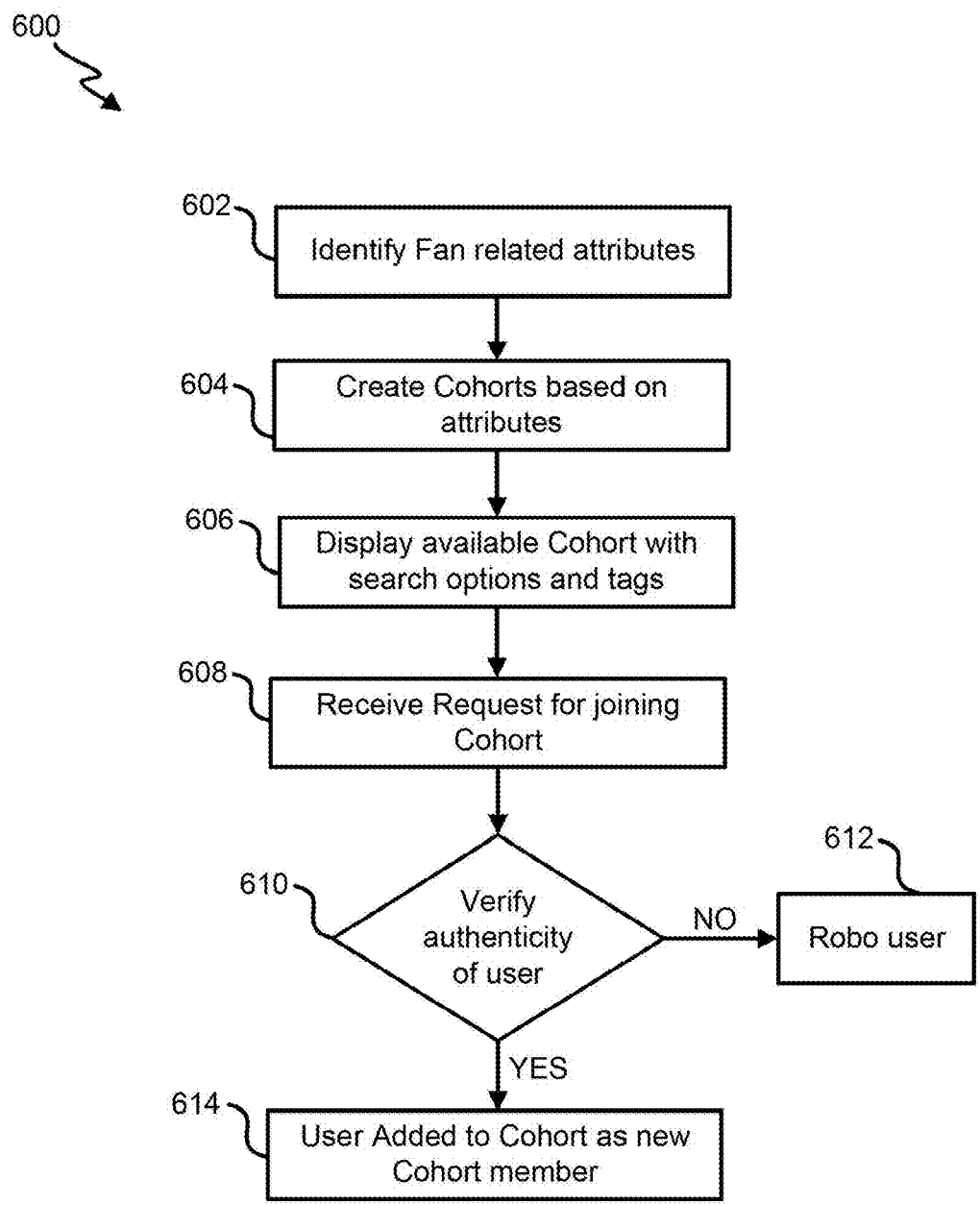
FIG. 6 illustrates a flowchart of differentiating robot users from authentic users according to an embodiment of the present disclosure.

Referring to FIG. 6, illustrates a flowchart 600 of differentiating robot users from authentic users. The flowchart begins with step 602, which involves identifying fan-related attributes such as historical booking information, social media activities related to the fan, interests, activities, and groups joined. The system then creates a plurality of groups based on these attributes at step 604. At step 606, the available groups are displayed with search options and tags on the user interface of the user device.

In one exemplary embodiment, the user can then select and request to join one or more groups from the plurality of groups displayed in step 608. The system verifies the authenticity of the user at step 610, and if the user is successfully authenticated, the system processes the request and adds the user to the requested group at step 614. Further, the user then becomes a member of the group. In case the user is not verified as an authentic user, the system concludes that the user is a bot or robot user at step 612 and terminates their request of joining the group.

Thus, in some instances, joining the groups includes being able to connect with like-minded fans, participate in group discussions and events, receive notifications about upcoming events and special offers, and stay up-to-date with news and updates related to the fandom. Moreover, by creating a community of fans, this system can enhance the overall fan experience and increase engagement with the brand or event.

In conclusion, FIG. 6 represents a flowchart for a system that identifies fan-related attributes and creates groups based on those attributes to provide a streamlined process for fans to join relevant groups. The system verifies the authenticity of the user and adds them to the requested group, providing technical benefits such as connecting with like-minded fans and enhancing the overall fan experience.

Figure 7:
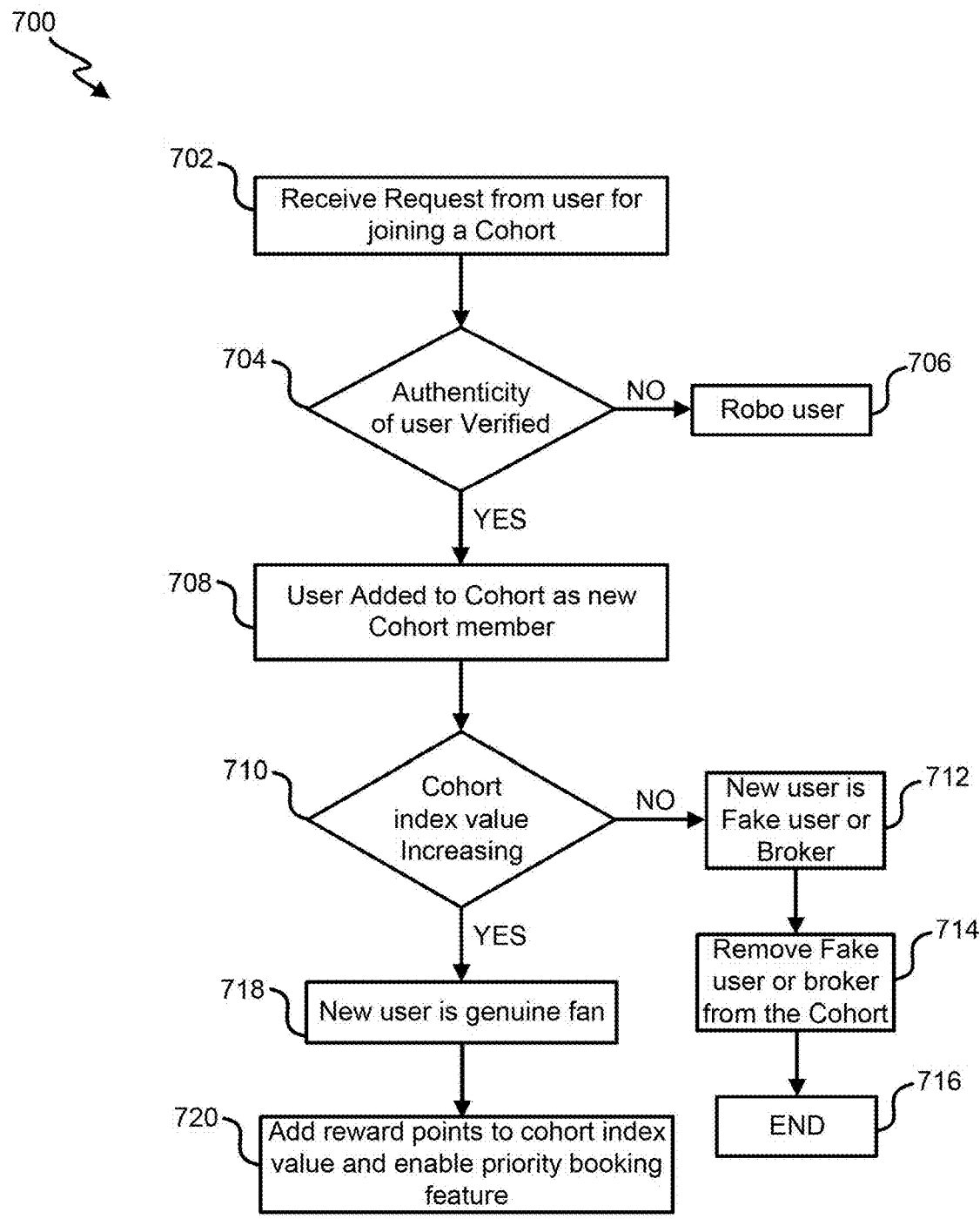
FIG. 7 illustrates a flowchart of differentiating brokers and robot users from authentic users, according to an embodiment of the present disclosure.

Referring to FIG. 7, illustrates a flowchart 700 that provides a general overview of the access rights booking and group check-in process. In one exemplary embodiment, the flowchart shows the different steps involved in the process and the decision points that the system uses to determine the authenticity of a user and whether to add or remove them from a group.

Step 702 involves receiving a request from a user to join a group, and step 704 involves authenticating the user by comparing their credentials with the credentials stored in the database and their user index value. The user index value is calculated based on various fan-related attributes such as historical booking information, social media activities related to the fan, interests, activities, and groups joined, among others.

If the authentication is unsuccessful, the system moves to step 706 and identifies the user as a robot or an unauthentic user, and terminates the process. However, if the authentication is successful, the system proceeds to step 708, where the user is added to the group as a new member. At step 710, the system analyses the group index value to determine whether it is increasing or decreasing after the addition of the new member.

If the group index value remains the same or decreases, at step 712, the system identifies the new member as a fake user and initiates the process of removing them from the group at step 714, leading to the termination of the process at step 716. On the other hand, if the group index value increases, at step 718, the system identifies the new member as a genuine fan and triggers step 720, where reward points are added to the group index value. The system also enables priority booking features for the entire group and other reward points based on the increase in the number of genuine users in a specific group.

In one exemplary embodiment, the system provides the facility of joining groups and accessing priority booking features, earning reward points, and being part of a community of like-minded individuals. The system also provides a way of identifying fake users and removing them from the group, ensuring that the community remains genuine.

Other embodiments of the system may include additional fan-related attributes for calculating the user index value, such as the number of the access rights purchased, the frequency of attendance, and the amount spent on access right. The system may also include machine learning algorithms that learn from user behavior and improve the accuracy of the authentication process over time.

Moreover, by using fan-related attributes and reward points, the system incentivizes genuine fans to join and participate in the community, while identifying and removing fake users to maintain the integrity of the community.

Figure 8:
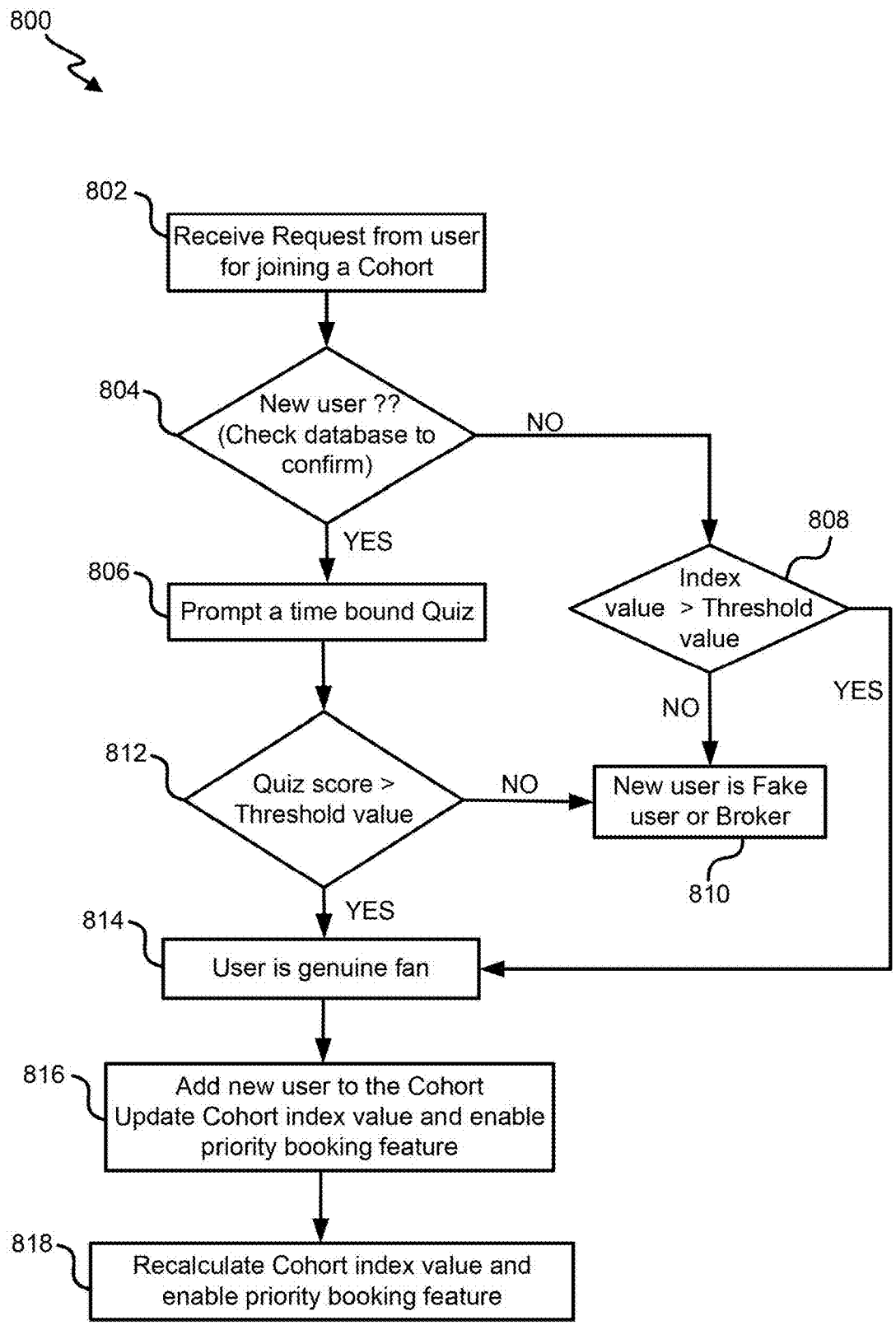
FIG. 8 illustrates a flowchart of adding new users to the group and updating the group index value in accordance with an embodiment of the present disclosure.

Referring to FIG. 8, illustrates a flowchart 800 representing the process of access rights booking and group check-in. The flowchart includes several steps, which are represented by their respective element numbers. The steps include receiving a request from a user for joining a group at step 802, authenticating the user at step 804, analyzing quiz scores at step 812, comparing user index values at step 808, and updating the overall group index value at step 816. The flowchart also shows the termination of the subsequent steps of the group joining for fake users or brokers at step 810 and at step 808.

Step 802 involves the user requesting to join a group, after which the system authenticates the user at step 804. The system identifies whether the request is from a new user or an existing user by comparing the user credentials with the credentials stored in the database, and accordingly, the system leads to either step 806 or step 808. At step 806, for new users, the system provides a time-bound quiz on the user interface of the user device, and at step 812, analyses the quiz score to identify genuine users or fake users or brokers. On the other hand, at step 808, for existing users, the system compares the user index value with the second threshold value to determine whether the user is genuine or fake, or a broker.

Based on the determination of the user as a genuine user at step 814, the system proceeds towards the next step 816, which involves adding new users to the group, updating the overall group index value, and enabling multiple features such as priority booking, smart queue, bonus, and discounts. Finally, at step 818, the system recalculates the updated group index value and enables the priority booking feature.

In one exemplary embodiment, the system provides the provision of a reliable and efficient group check-in and the access rights booking, which ensures genuine users' participation while preventing fake users and brokers' inclusion. Moreover, the benefits of joining groups include priority booking, smart queue, bonuses, and discounts, which can save time and money for users while ensuring a more enjoyable experience.

In addition to the above-disclosed embodiment, the system and method can also be implemented using various other parameters for identifying genuine users, such as social media influence, geographic location, and others. Moreover, the system can also be configured to enable users to form and join multiple groups, which can have different features and benefits. The disclosed system and method are not limited to the specific flowchart shown in the drawings but can be implemented using various other methods and techniques.

Figure 9:
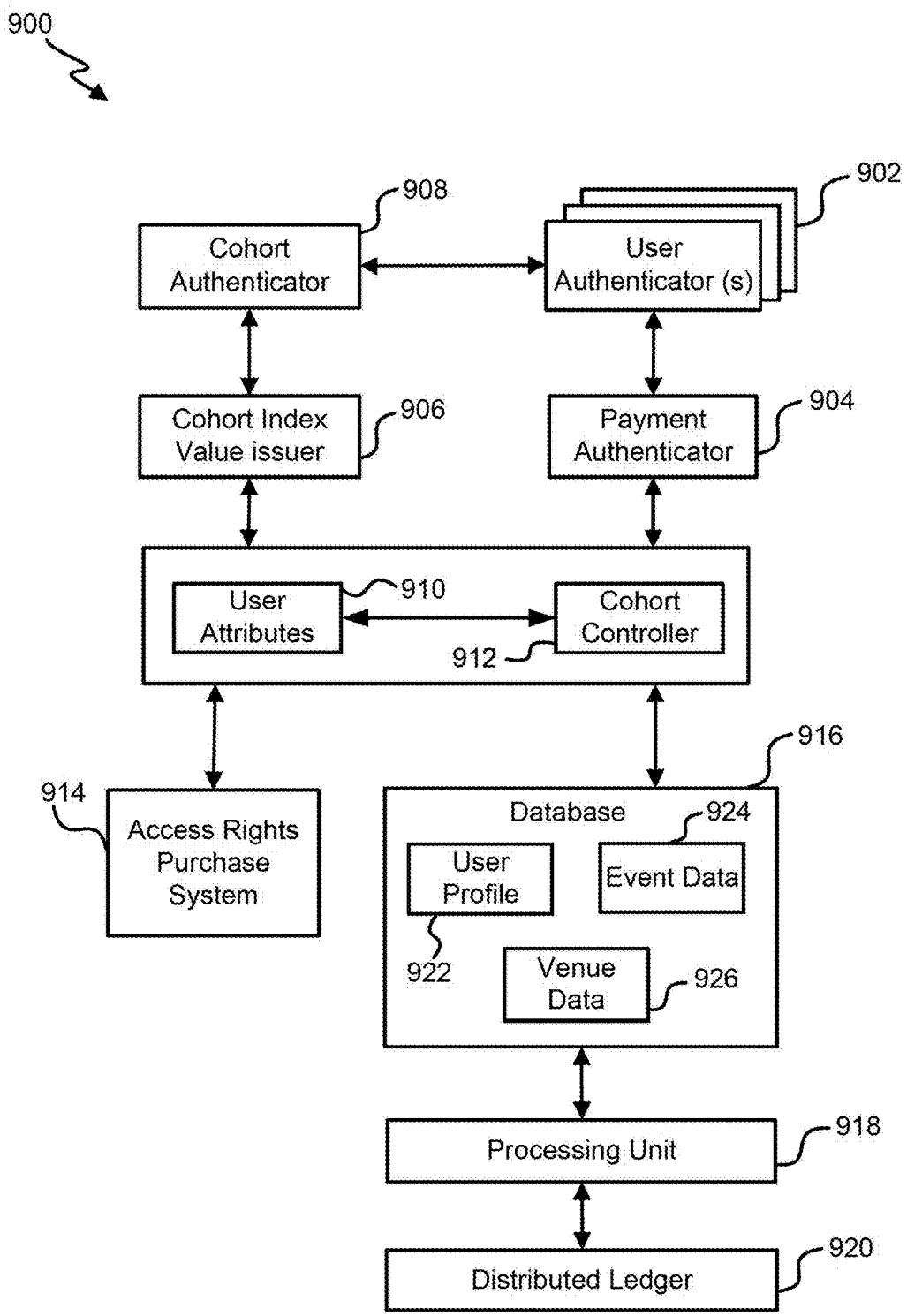
FIG. 9 illustrates a block diagram of the access rights purchase system in accordance with an embodiment of the present disclosure.

Referring to FIG. 9, illustrates a block diagram of the access rights purchase system in accordance with an embodiment of the present disclosure. In one exemplary embodiment, the general overview 900 shows the different components of the system, which include a user authenticator 902, payment authenticator 904, group index value issuer 906, and group authenticator 908. These components are interconnected serially with each other and coupled with a module having user attributes 910 and group controller 912, wherein the user attributes are coupled with group controller 912 internally.

The user authenticator 902 is responsible for authenticating the user's identity and verifying their personal information. The payment authenticator 904 verifies the payment details and ensures that the payment is processed correctly. The group index value issuer 906 assigns a unique group index value to each group during the booking process, which is used for group identification purposes. The group authenticator 908 authenticates the group members' identities and ensures that the group members are authorized to enter the event.

The module including user attributes 910 and group controller 912 is responsible for managing the user attributes and controlling the group membership. The user attributes include personal information, such as name, address, contact details, and other relevant information, which are used for authentication and verification purposes. The group controller 912 manages the group membership, including adding or removing members, updating group information, and other related tasks.

The module including user attributes 910 and group controller 912 is also coupled with a access rights purchase system 914 and a database 916. The access rights purchase system 914 enables users to purchase event access right online. The database 916 stores user profiles 922, event data 924, and venue data 926 for further authentication and verification purposes. Database 916 is also connected to a processing unit 918 and a distributed ledger 920.

Processing unit 918 performs various processing tasks, including data processing, authentication, and verification. The distributed ledger 920 records all the transactions and changes made to the system, which ensures transparency and security.

Furthermore, FIG. 9 also illustrates a block diagram outlines the operational architecture of an access rights purchase system, tailored to facilitate cohort-based affinity grouping and access control within venues. The system includes the cohort authenticator, payment authenticator, cohort index value issuer, and cohort controller. Each component serves a pivotal role in orchestrating a seamless user experience and ensuring robust security measures throughout the access rights acquisition process.

The cohort authenticator perform the responsibility for verifying the identities of cohort members, and ensures that only authorized individuals gain access to the venue thereby fortifying the overall security framework of the system.

Meanwhile, the payment authenticator operates in tandem with the cohort authenticator to validate payment details submitted by users during the access rights purchase process. By scrutinizing payment transactions, this component guarantees the integrity of financial transactions and mitigates the risk of fraudulent activities, fostering trust and confidence among users.

In addition, the cohort index value issuer, assigns unique cohort index values to each cohort during the booking phase. These index values serve as distinctive identifiers for cohorts, facilitating efficient cohort management and authentication processes. Through this mechanism, the system can precisely track and monitor cohort activities, enhancing operational efficiency and logistical coordination.

Furthermore, the cohort controller serves as the central command hub for cohort management operations. Tasked with overseeing various cohort-related tasks, such as cohort membership management, information updates, and access authorization, this component embodies the operational backbone of the system. Its seamless integration with other system modules enables swift and agile cohort management, ensuring a frictionless user experience for all stakeholders involved.

The cohort index value issuer assigns unique cohort index values to each cohort during the booking process. These index values serve as identifiers for cohorts, enabling efficient management and authentication. However, the issuance of these values involves more than mere numbering.

Firstly, the issuer employs the machine learning algorithms to generate index values that are statistically unique, ensuring minimal chances of duplication or overlap. These values are carefully crafted to encode essential cohort attributes and characteristics, allowing for seamless identification and tracking across various stages of the access control process. Moreover, the issuer integrates cryptographic techniques to safeguard the integrity and confidentiality of these index values, mitigating the risk of tampering or unauthorized access.

Furthermore, the issuer dynamically adjusts index values based on contextual factors such as cohort size, composition, and activity level. For instance, as cohorts evolve over time, the issuer recalibrates index values to reflect changes in membership or behavioral patterns, thereby maintaining the accuracy and relevance of cohort identification. Additionally, the issuer interfaces with external databases and analytics engines to enrich index values with supplementary information, enhancing their utility for decision-making and operational optimization.

In one exemplary embodiment, the cohort controller serves as the nerve center for cohort management operations within the system. The cohort controller processes aimed at maintaining cohesion and efficiency within cohorts. To achieve this, the cohort controller is equipped with an array of functionalities and capabilities:

In addition, the disclosed patent application provides various embodiments and examples of the system and method, which include different variations and configurations of the components. For example, the user attributes can include biometric data, such as facial recognition or fingerprint data, for more secure authentication. The group controller can also be configured to manage different types of groups, such as VIP or corporate groups, with different access levels and privileges. These embodiments and examples provide flexibility and customization to the system, which can better suit different event organizers' needs.

Figure 10:
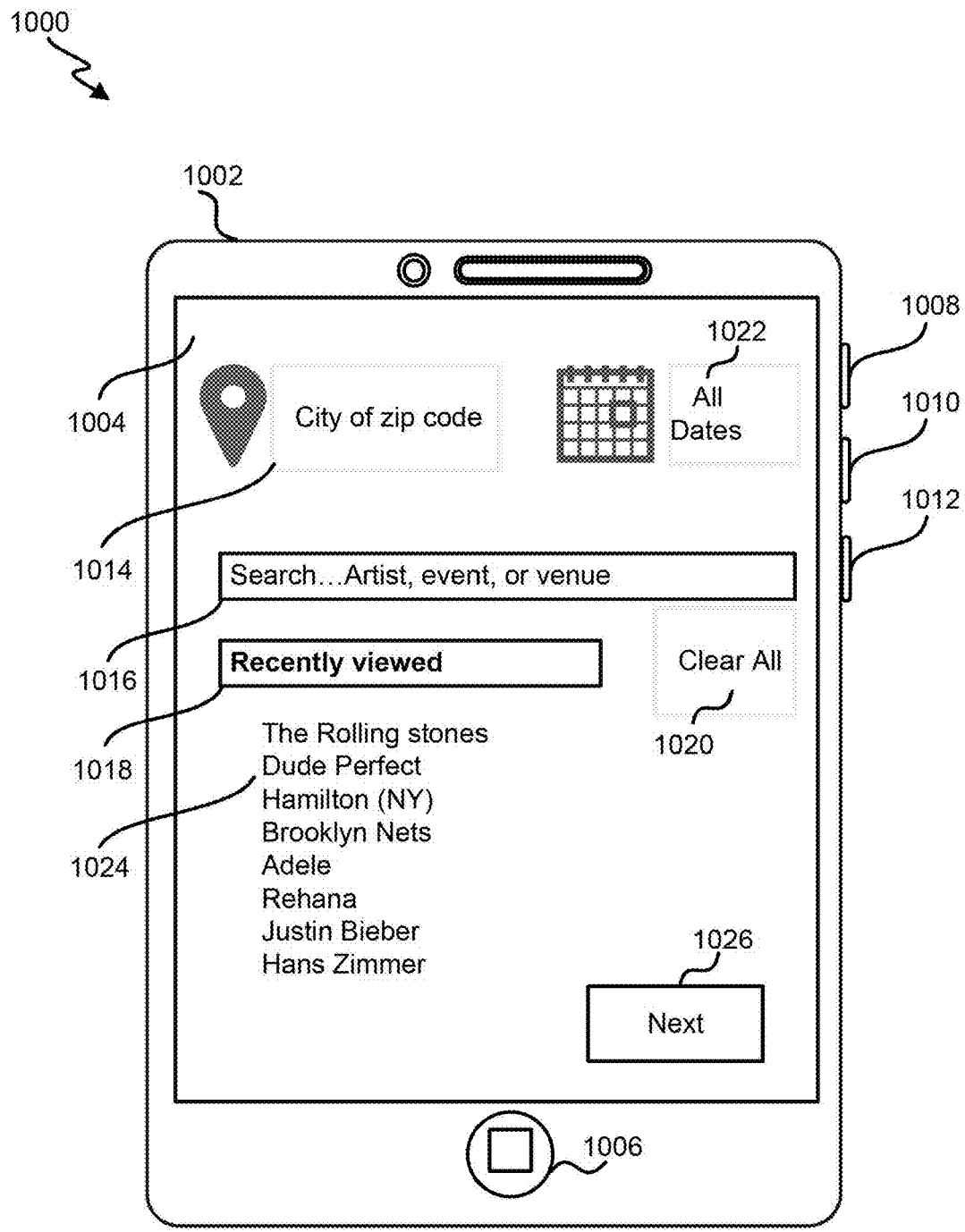
FIG. 10 illustrates an access rights booking application running on an end-user device for purchasing access right in accordance with an embodiment of the present disclosure.

Referring to FIG. 10, illustrates a access rights booking application running on an end-user device for purchasing access right in accordance with an embodiment of the present disclosure. In one exemplary embodiment, FIG. 10 depicts a user device 1000 that is used for the access rights booking process and group check-in process. The user device 1002 includes a user interface 1004 that displays multiple soft buttons and options for the user to book access right, authenticate, and check-in for a live event. The control button 1006 is located at the bottom center of the user device 1002, which enables the user to access different features of the device. The volume up switch 1008 and volume down switch 1010 are used to adjust the volume of the device, and the lock screen button 1012 is used to lock the device's screen.

The user interface 1004 includes several elements, such as the location information icon 1014 which shows the current location of the user. The Calendar 1022 helps the user to select the date for the event, and the search bar 1016 allows the user to search for the desired event. The recently viewed item 1018 displays the user's recent activity, and the list of recently viewed items 1024 shows a list of all recently viewed items. The clear all soft button 1020 allows the user to clear all the recent activities, and the next button 1026 is used to move to the next window after providing all the necessary details.

In one exemplary embodiment, represents a user-friendly interface for booking access right and group check-ins for live events. The user can easily navigate through the different options and features of the user device 1002 to book access right and join groups.

In yet another example, the mobile application provides real-time updates on the status of the event, such as the availability of access right and the number of people in a group. Additionally, joining groups provides several advantages, such as discounted access rights prices, priority access to the event, and the opportunity to meet like-minded people.

In yet another example, other possible embodiments and examples may include additional features and options for the user, such as a payment gateway, seat selection, and event reminders. The user device 1002 may also include a camera and a microphone for enhanced security and authentication purposes. Furthermore, the mobile application may provide additional services, such as hotel bookings and transportation services, for the user's convenience.

Figure 11:
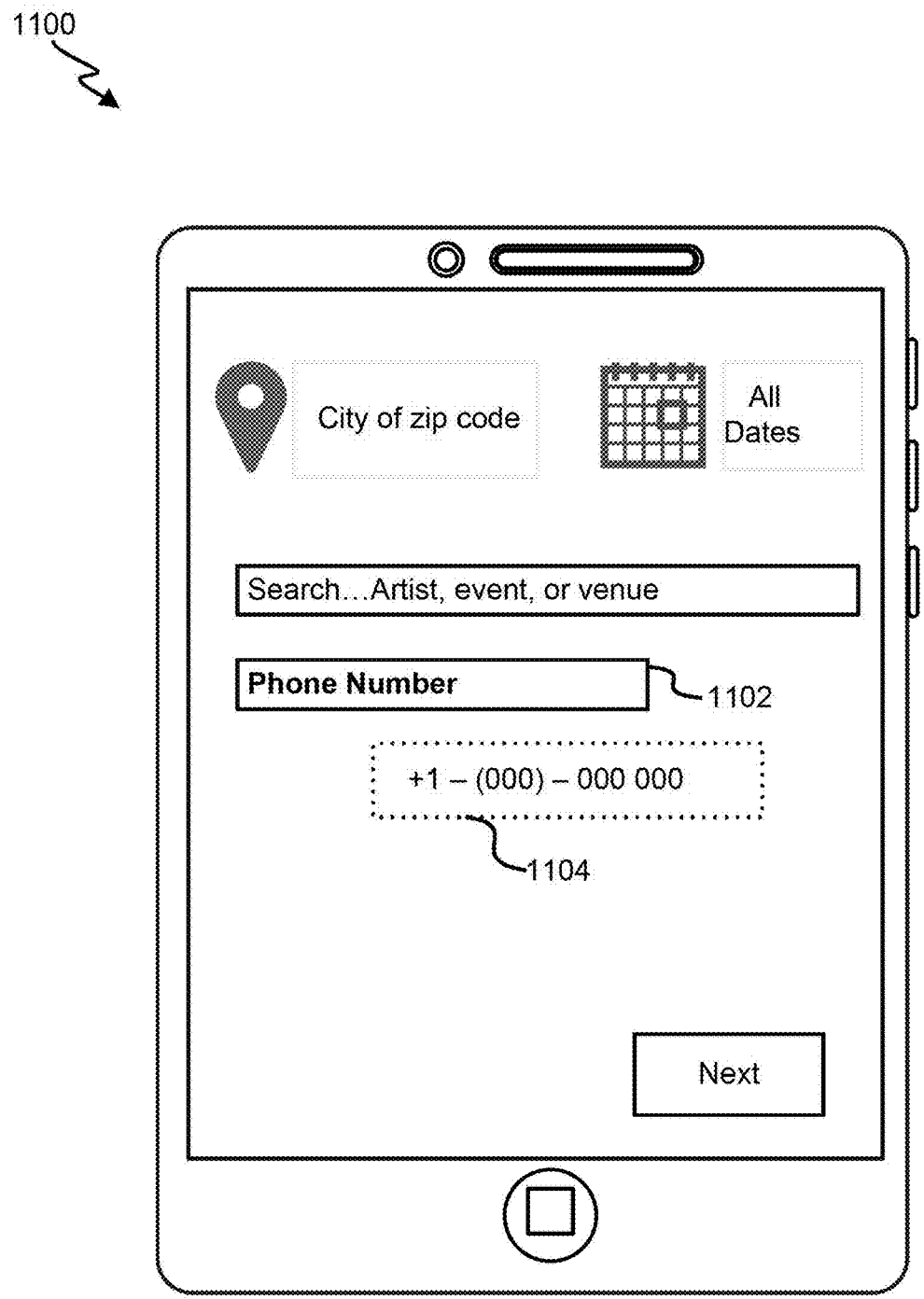
FIG. 11 illustrates an example embodiment of the access rights booking application for providing instructions to users for authentication in accordance with an embodiment of the present disclosure.

Referring to FIG. 11, illustrates an example embodiment of the access rights booking application for providing instructions to users for authentication in accordance with an embodiment of the present disclosure. In one exemplary embodiment, FIG. 11 depicts a representation of a user device 1100 that provides a general overview of a access rights booking process and a group check-in process. The user interface includes various soft and hard buttons as described in FIG. 10, and in addition, a pop-up window 1102 is displayed on the user interface that shows phone number details. An editable area 1104 is also provided where the user can input their phone number to complete the authentication and verification process.

User device 1100 represents the user device, which could be a smartphone or a tablet computer, used for accessing the access rights booking application. Element 1102 represents the pop-up window displayed on the user interface that shows phone number details. Editable area 1104 represents the editable area provided for the user to enter their phone number.

In one exemplary embodiment, the system provides enhanced security for the access rights booking process by providing an additional authentication and verification step via the phone number. This helps in preventing fraud and unauthorized access to the access rights booking system. The editable area also makes it easy for the user to enter their phone number, improving the user experience.

In addition, joining a group offers many advantages such as sharing the cost of access right, accessing exclusive group discounts, and being able to enjoy events with friends and family. Group check-ins also provide a hassle-free experience, eliminating the need for queuing and reducing the likelihood of missing out on events due to late arrivals.

Other possible embodiments of this embodiment include additional security measures such as facial recognition or fingerprint scanning, or the inclusion of additional user information such as email or social media profiles for enhanced authentication and verification.

Figure 12:
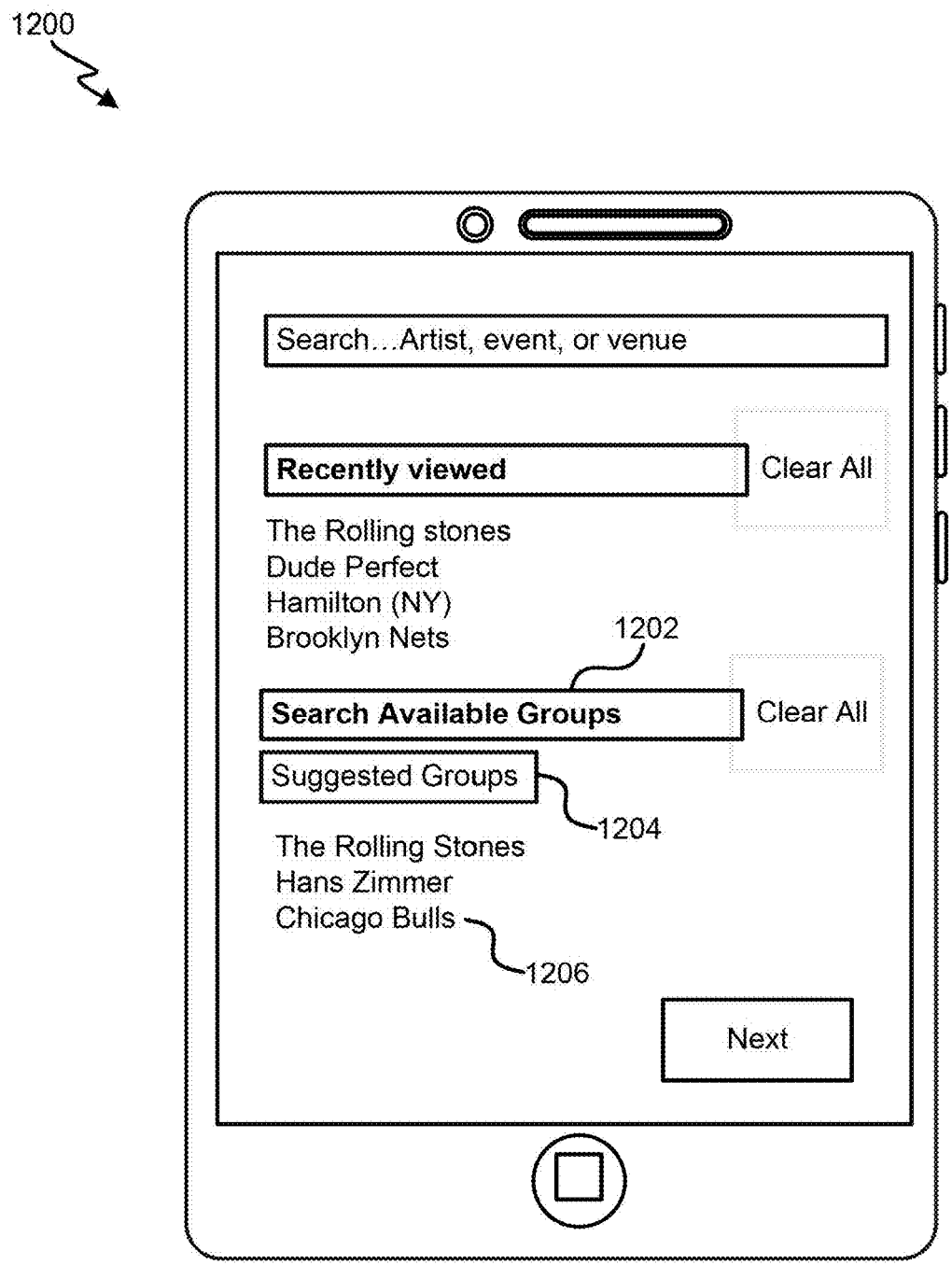
FIG. 12 illustrates an example embodiment of the access rights booking application for selecting a live event and selecting a group in accordance with an embodiment of the present disclosure.

Referring to FIG. 12, illustrates an example embodiment of the access rights booking application for selecting a live event and selecting a group in accordance with an embodiment of the present disclosure. In one exemplary embodiment, FIG. 12 depicts a representation of a user device 1200 that provides a general overview of a access rights booking process and a group check-in process. The user interface 1004 is embedded within the user device 1200, as described in FIG. 10. After the successful completion of authentication, the user interface provides multiple options for viewing recently viewed items or an option for clearing all recently viewed items. Additionally, the user interface includes an interface for searching available groups 1202, an interface that provides suggested groups 1204, and a list of suggested groups 1206 as a result of search options.

Element 1200 represents the user device, which could be a smartphone or a tablet computer, used for accessing the access rights booking application. FIG. 12 represents the user interface 1004 embedded within the user device. Element 1202 represents the interface for searching available groups. Element 1204 represents the interface that provides suggested groups. Element 1206 represents the list of suggested groups as a result of search options.

In one exemplary embodiment, the system enhances the user experience by providing additional options for recently viewed items and suggested groups. This helps users quickly and easily find the information they need and to make informed decisions about which events and groups to join.

Other possible embodiments of this patent drawing could include additional search options such as filtering by location or event type, or the inclusion of additional suggested groups based on user preferences or past attendance history.

Figure 13:
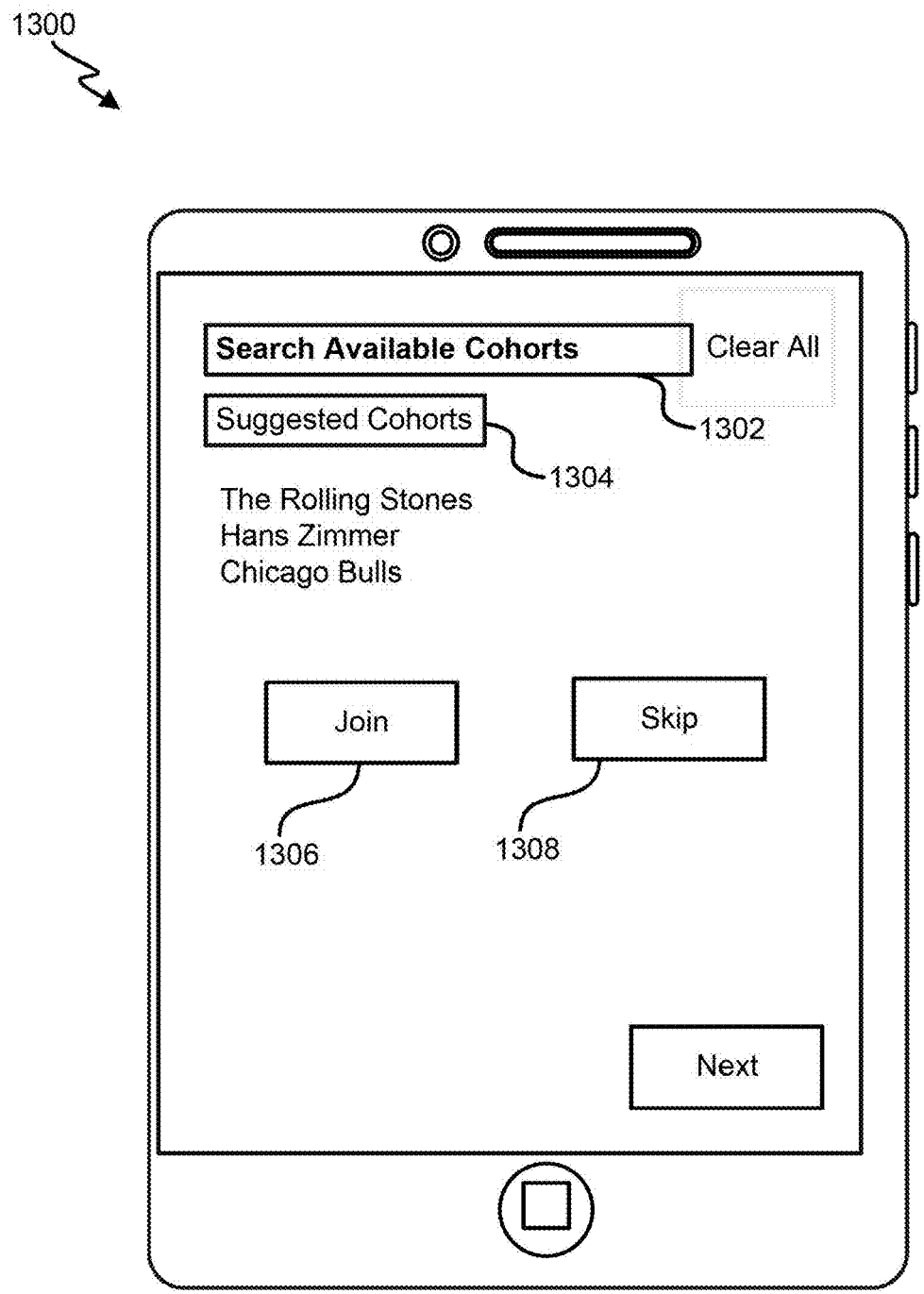
FIG. 13 illustrates an example embodiment of the access rights booking application for searching available groups according to an embodiment of the present disclosure.

Referring to FIG. 13, illustrates an example embodiment of the access rights booking application for searching available groups according to an embodiment of the present disclosure. In one exemplary embodiment, FIG. 13 represents a user device 1300 that provides a general overview of a access rights booking process and a group check-in process, including all the features as described in FIG. 10-12. The user interface includes a search available groups 1302 soft button and suggested groups 1304. Additionally, the user interface provides a join button 1306 for joining the suggested groups and a second skip button 1308 which enables a user to skip joining any of the suggested groups.

Element 1300 represents the user device, which could be a smartphone or a tablet computer, used for accessing the access rights booking application. Element 1302 represents the soft button for searching available groups. Element 1304 represents the suggested groups. Element 1306 represents the join button for joining the suggested groups. Element 1308 represents the skip button for skipping joining any of the suggested groups. Group check-ins provide a hassle-free experience, eliminating the need for queuing and reducing the likelihood of missing out on events due to late arrivals.

Yet another example includes additional search options such as filtering by location or event type, or the inclusion of more personalized suggested groups based on user preferences or past attendance history.

Figure 14:
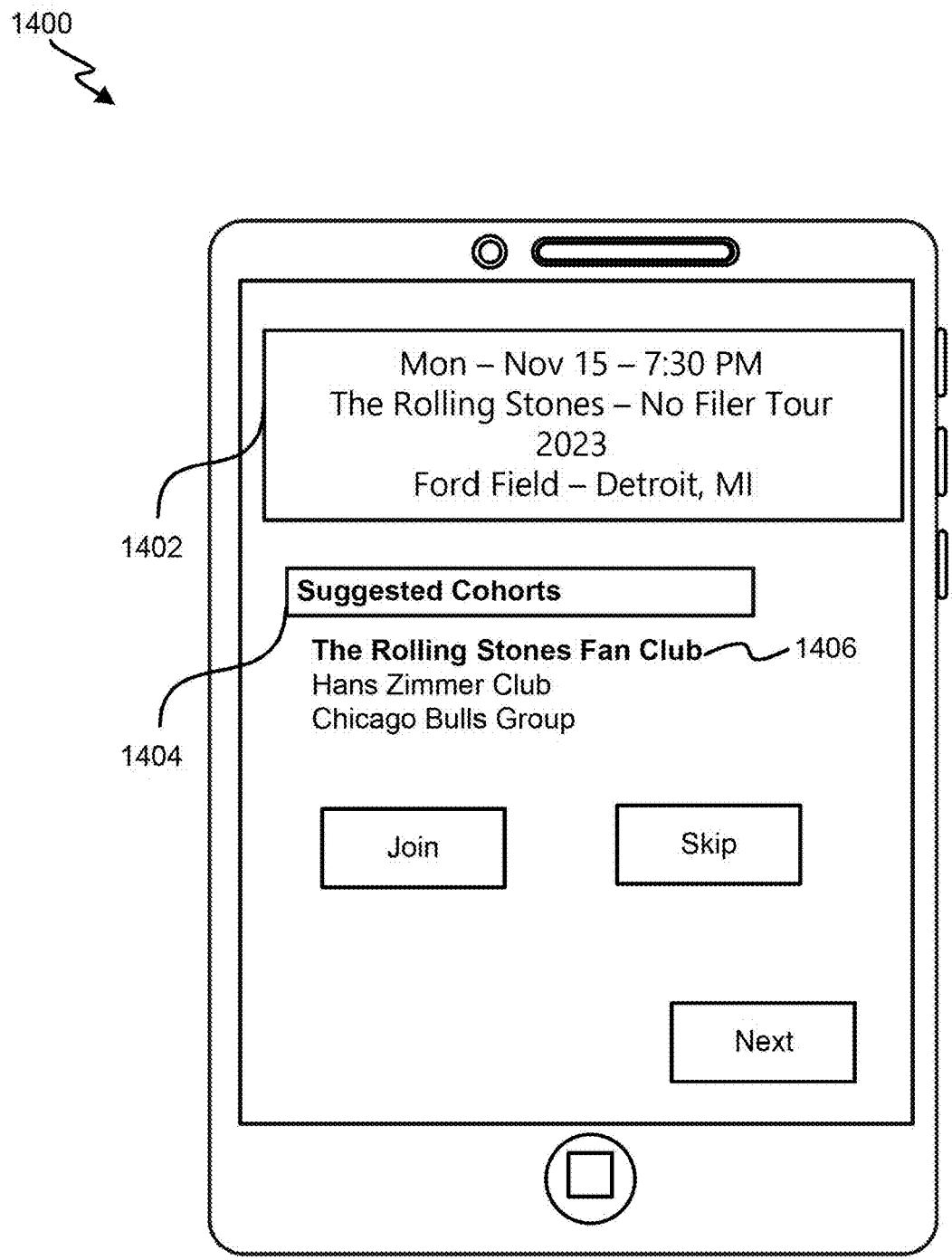
FIG. 14 illustrates an example embodiment of the access rights booking application for a group joining another embodiment of the present disclosure.

Referring to FIG. 14, illustrates an example embodiment of the access rights booking application for a group joining another embodiment of the present disclosure. In one exemplary embodiment, FIG. 14 represents a user device 1400 that provides a general overview of access rights booking and group check-in processes. Once the access rights is booked for an event, the event details 1402 are displayed on the user interface. From the suggested groups 1404, the user selects at least one group 1406 based on providing input on the user interface. The user interface enables a user to either join suggested groups or skip the selection of any groups.

Element 1400 represents the user device, which could be a smartphone or a tablet computer, used for accessing the access rights booking application. Element 1402 represents the event details displayed on the user interface. Element 1404 represents the suggested groups. Element 1406 represents the user's selection of at least one group based on providing input on the user interface.

As another example, the present system includes additional features such as the ability to create and manage personal groups, or the inclusion of a chat function within the group interface to facilitate communication between group members.

Figure 15:
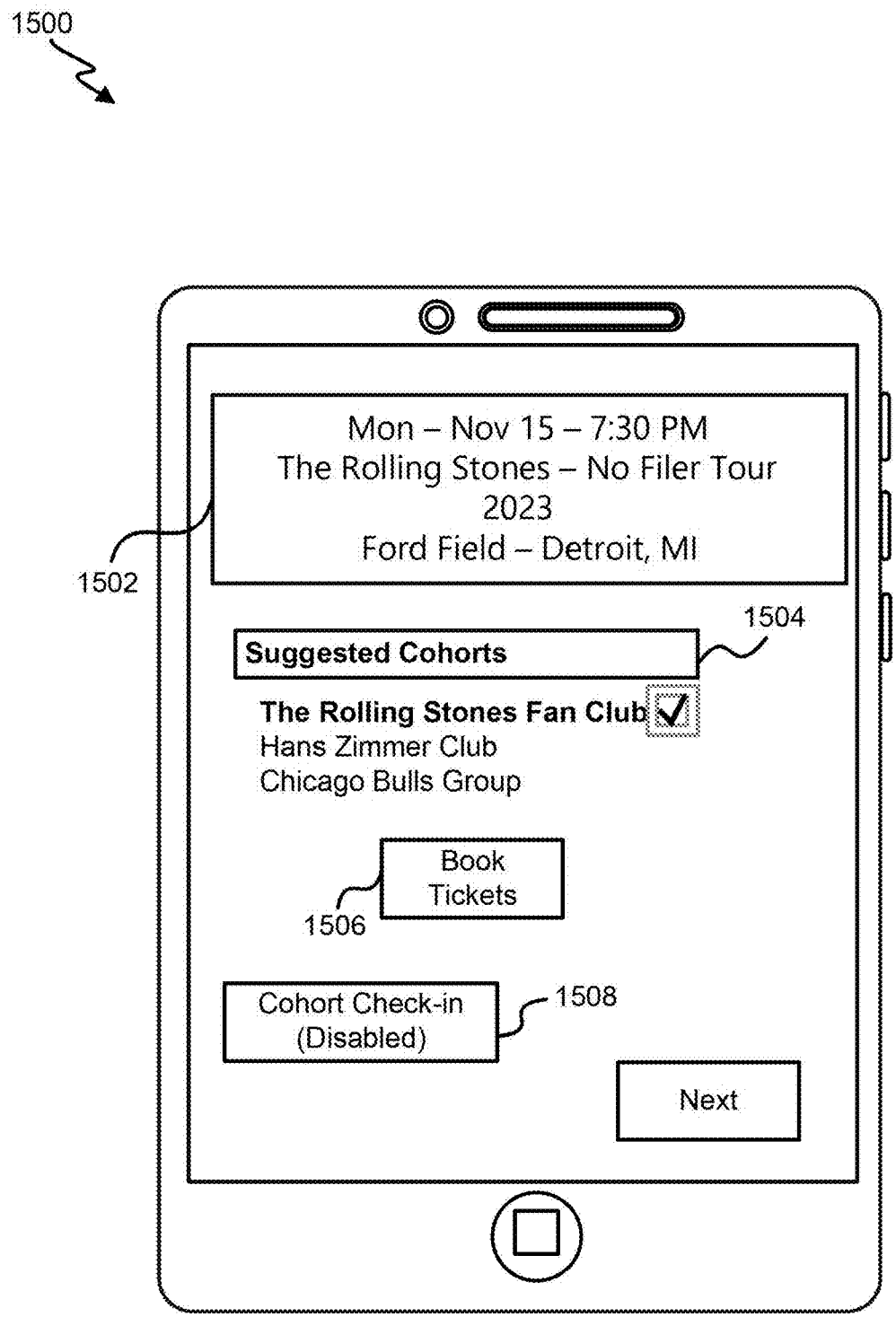
FIG. 15 illustrates an example embodiment of the access rights booking application for group check-in according to another embodiment of the present disclosure.

Referring to FIG. 15, illustrates an example embodiment of the access rights booking application for group check-in. In one exemplary embodiment, FIG. 15 represents a user device 1500 displaying a user interface for booking event access right and joining groups. The user interface includes event details 1502, which may include information such as the event name, location, date, and time. The user interface also displays suggested groups 1504 for the user to join, and at least one group is highlighted with a tick mark to indicate that the user has selected it. The user interface further includes a book access right button 1506 and a group check-in button 1508.

To book access right and join a group, the user provides all the entailed inputs and selects the desired group by ticking the corresponding checkbox. Once the user has completed these actions, the user can press the button to book access right 1506 to confirm the booking and group joining. At this point, the system enables the group check-in button 1508, which allows the user to check-in to the event with the selected group.

Thus, in some instances, by displaying event details and suggested groups on a single screen, the user can quickly and easily select the desired options without having to navigate through multiple screens or menus. Additionally, the disabled state of the group check-in button until the booking and group joining are confirmed ensures that the user does not accidentally attempt to check-in to the event before their booking is complete.

Using electronic devices and mobile applications for access rights booking and joining groups provides several technical benefits such as real-time updates and notifications about the event and changes in the schedule or venue. Also, joining groups provides social benefits, such as meeting new people with similar interests and enhancing the overall event experience.

Similar paragraphs related to this disclosure may include other possible embodiments and examples, such as displaying a seating chart for the event and allowing the user to select specific seats, or displaying user ratings and reviews for the event and the suggested groups. Additionally, the user interface may include options for sharing the event and group information on social media platforms inviting friends to join the same group. These embodiments and examples all aim to enhance the user experience and simplify the access rights booking and group joining process.

Figure 16:
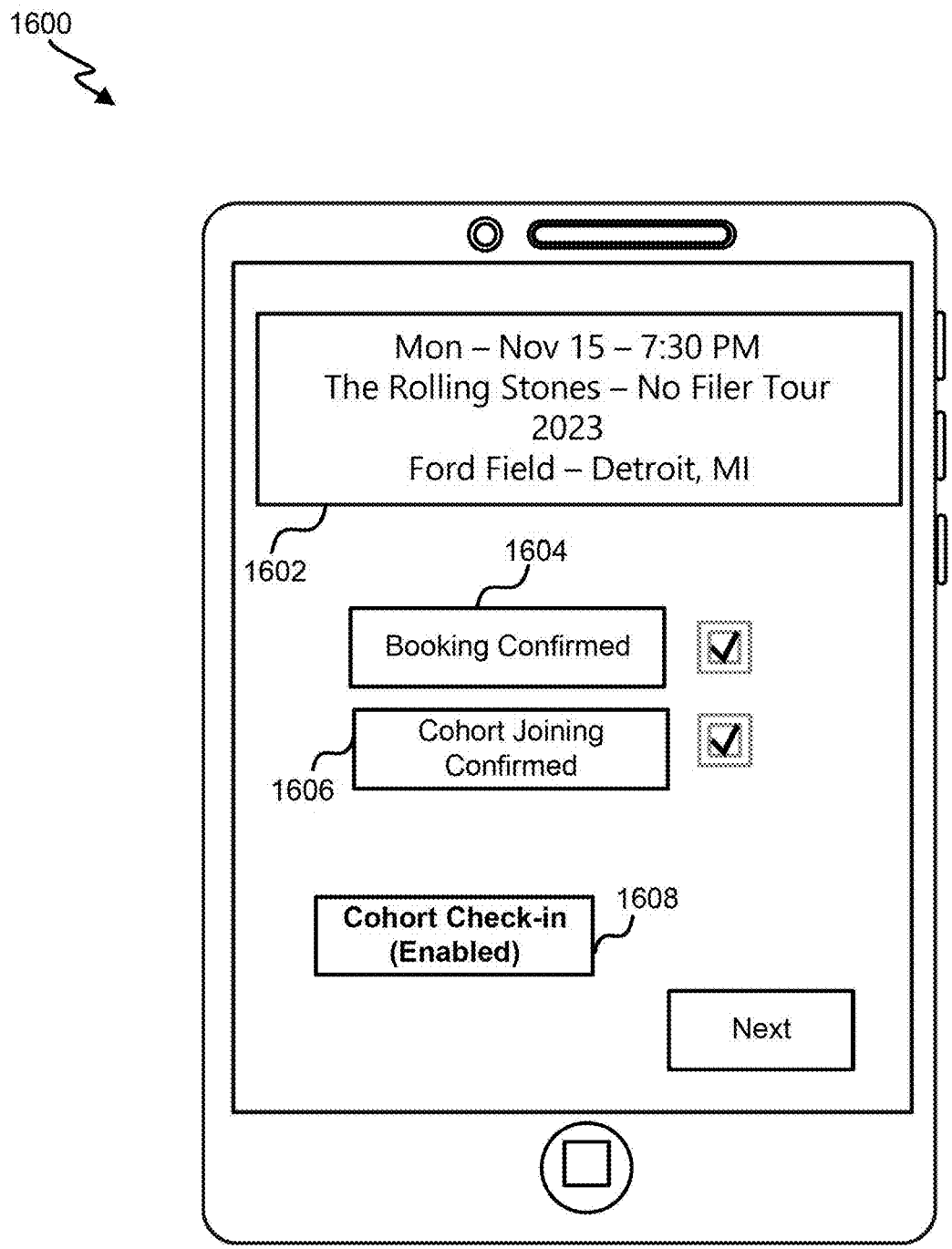
FIG. 16 illustrates an example embodiment of the access rights booking application for group check-in and smart queue according to another embodiment of the present disclosure.

Referring to FIG. 16, illustrates an example embodiment of the access rights booking application for group check-in and smart queue according to another embodiment of the present disclosure. In one exemplary embodiment, FIG. 16 represents a user device 1600 and provides an overview of the access rights booking process and group check-in process. The drawing includes several elements, including event details 1602, booking confirmation 1604, confirmation of group joining 1606, and a group check-in button 1608.

The event details 1602 indicate the specifics of the event being booked, such as the date, time, location, and other relevant information. The booking confirmation 1604 indicates that the user's access rights reservation has been confirmed, and the confirmation of group joining 1606 indicates that the user has successfully joined a group associated with the event.

Once the user device receives both the booking confirmation 1604 and the confirmation of group joining 1606, the group check-in button 1608 becomes enabled. This allows any user from the group to initiate the check-in process once it becomes available.

In one exemplary embodiment, by requiring confirmation of group joining before enabling the group check-in button, the system ensures that only members of the group can initiate the check-in process. This helps to prevent fraudulent activity and ensures that group members are accounted for during the check-in process.

Other embodiments and examples may include variations in the types of events or groups that can be booked through the system. For example, the system could be used to book access right for sporting events, concerts, or other types of gatherings. Additionally, the system could be used to create groups for other purposes, such as networking events or team-building activities.

Figure 17:
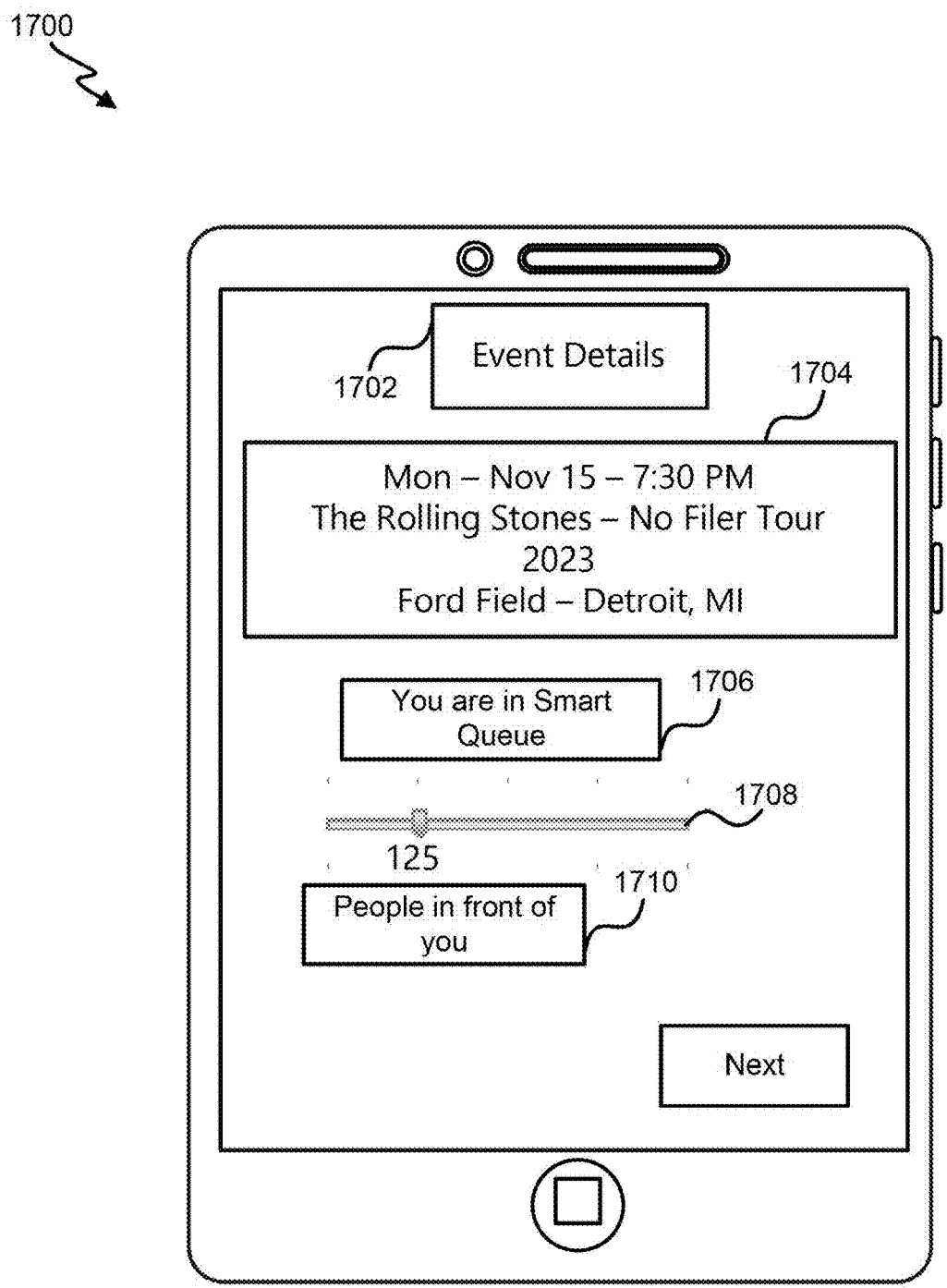
FIG. 17 illustrates an example embodiment of the access rights booking application and smart queue according to another embodiment of the present disclosure.

Referring to FIG. 17, illustrates an example embodiment of the access rights booking application and smart queue. In one exemplary embodiment, FIG. 17 represents the user interface of a mobile application for booking event access right and group check-ins. Moreover, FIG. 17 represents the user device 1700, which provides an overview of the access rights booking and group check-in process. The user interface shows various details related to event booking, including event details 1702, which are displayed after booking confirmation, and event details with time and location 1704. The smart queue 1706 and the smart queue indicator 1708 provide a visual indication of the current status of the user, and the count number of people ahead of the user 1710 gives an estimate of the waiting time.

When the check-in function is enabled by the system, the user can join the group using the mobile application. The smart queue 1706 and the smart queue indicator 1708 provide real-time information about the user's position in the queue, and the count number of people ahead of the user 1710 gives an estimate of the waiting time. This allows users to plan their arrival time accordingly and avoid waiting in long queues.

Figure 18:
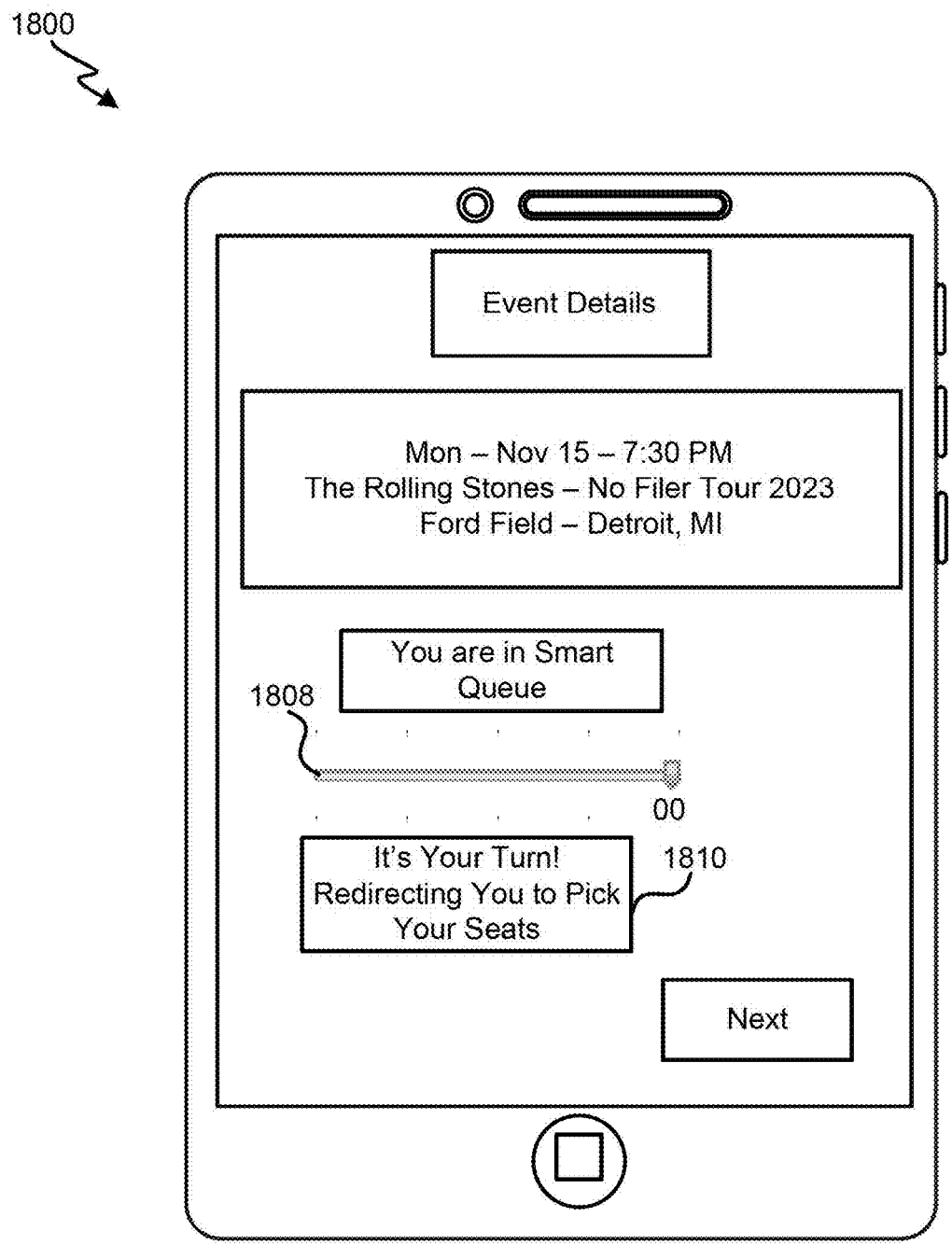
FIG. 18 illustrates an example embodiment of the access rights booking application for group check-in and seat selection according to another embodiment of the present disclosure.

Referring to FIG. 18, illustrates a user device 1800 that provides an overview of the access rights booking and group check-in process. FIG. 18 includes two elements: a smart queue indicator 1808 and a notification button 1810 on the user interface. The smart queue indicator 1808 shows the updated status of the queue, indicating how many users are ahead of the current user. As the users ahead of the current user are served, the indicator will reach zero, indicating that it is the user's turn to pick the seats.

Once the indicator reaches zero, the notification button 1810 on the user interface will change to show that it is the user's turn to pick the seats. Based on the user's input on the notification button 1810, the user interface will be redirected to the available seating arrangement, showing the status of vacant/available seats. This allows the user to easily pick the seats they want.

In one exemplary embodiment, the system improves the efficiency of the access rights booking and check-in process. By providing a clear indicator of the user's place in the queue and notifying them when it is their turn to pick the seats, the process is streamlined, reducing the time users spend waiting in line and improving the overall experience.

Other possible embodiments and examples related to this disclosure include using the smart queue indicator and notification button for other types of events, such as concerts or sports games. Additionally, the user interface could include additional features, such as the ability to view the seating chart or purchase additional access right for friends or family members.

Figure 19:
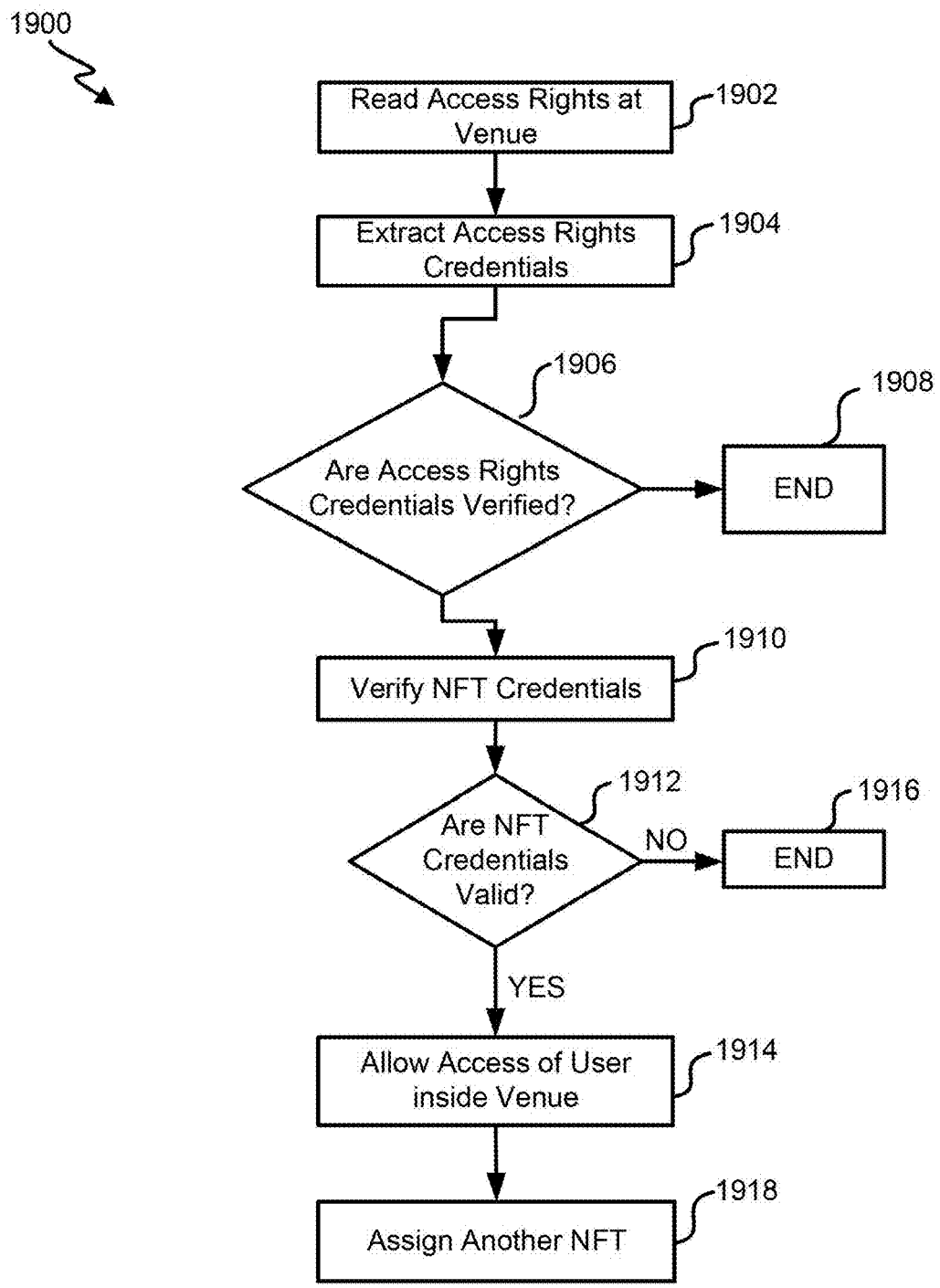
FIG. 19 illustrates a flowchart of issuing a non-fungible token (NFT) after completion of check-in for a live event according to another embodiment of the present disclosure.

Referring to FIG. 19, illustrates a flowchart describing process 1900 for entering a user inside the venue. Process 1900 begins when a user arrives at an entry of the venue. At block 1902, access right bought by the user are scanned at the venue by a access rights reader present at the entrance of the venue. At block 1904, the access rights credentials are extracted. The access rights can have a bar code that can store necessary details relating to the authentication of the user at the venue. At block 1906, the access rights credentials are verified.

In one embodiment, to authenticate the user, the access rights credentials can be sent over to the server(s) which can the details relating to the access rights and the user to verify whether the user who bought the access rights is trying to enter the venue.

In another embodiment, the access rights credentials are not sent to the server and the authentication of the user can be done using one or more biometric sensors present on the end-user device or any computing device present at the venue. However, if the user credentials are not found to be valid, the user is not permitted access inside the venue and the process ends (block 1908).

If the access rights credentials are found to be valid, at block 1910, the NFT credentials are verified. The NFT(s) are assigned to a user along with a purchase of the access rights. The NFT credentials help verify whether the user who bought the access rights and the one who is entering the venue is the same. Since each NFT is exclusive to a user, it is easy to identify ownership of the access rights by verifying the NFT credentials. At block 1912, if the NFT credentials are found to be valid, the user is permitted access inside the venue, at block 1914. However, if at block 1912, the NFT credentials are not found to be valid, the user is denied access inside the venue, and process 1900 ends (at block 1916). Further, to encourage the user to attend more events and to provide an incentive to the user for attending the current event, another NFT is assigned to the user, at block 1918. The user can use this newly assigned NFT inside the venue for improving the in-venue purchase.

Figure 20:
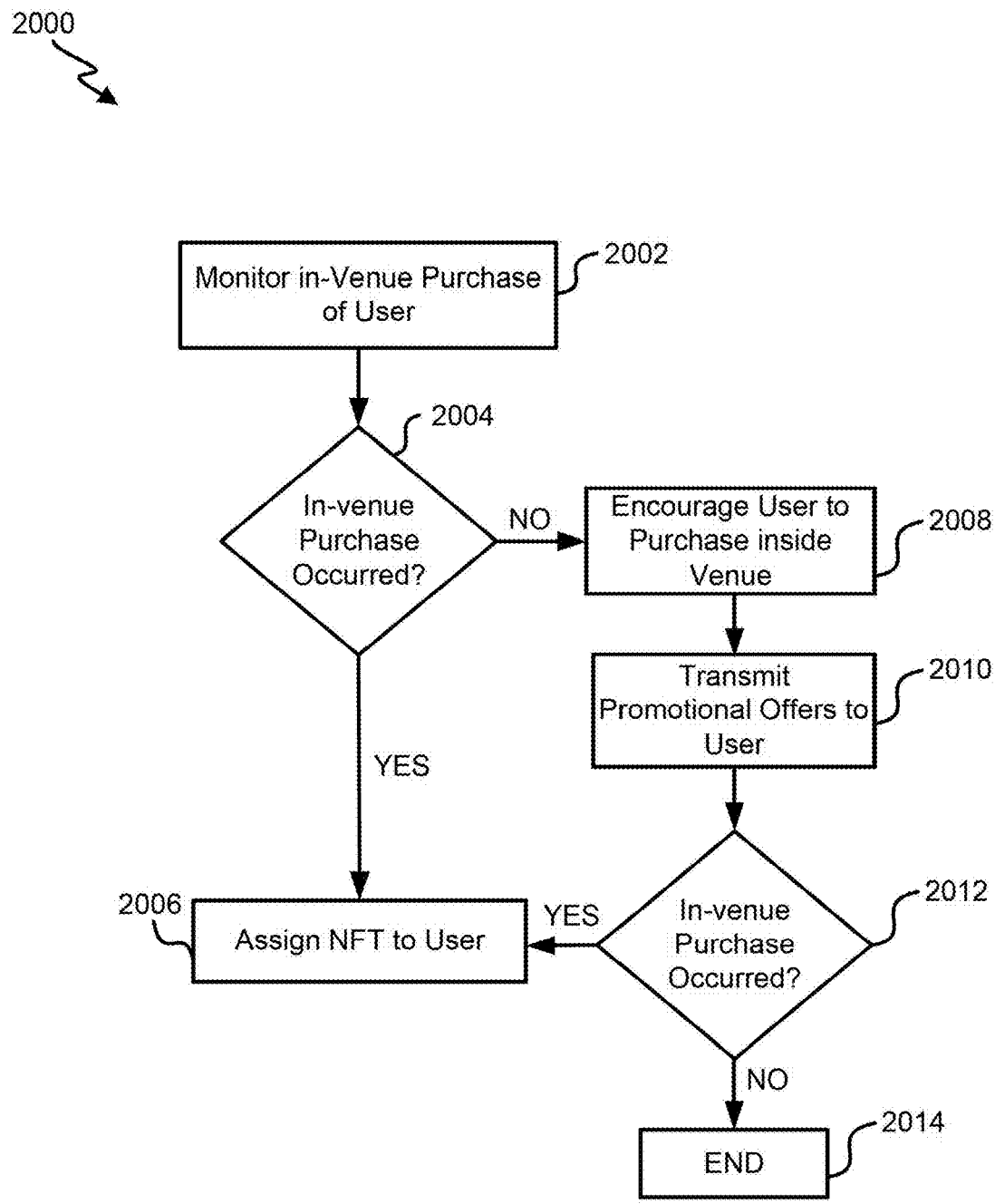
FIG. 20 illustrates an example embodiment of issuing NFTs to users based on their activities inside the venue according to another embodiment of the present disclosure.

Referring to FIG. 20, illustrates a flowchart of process 2000 for improving the in-venue experience of a user. The venue management device(s) encourages the user to purchase more so that more revenue can be generated for the venue. Since each NFT has a value associated with it, assigning NFTs on every purchase of the user can encourage the user to purchase more.

At block 2002, in-venue purchases of the user are monitored. The in-venue purchases of the user indicate purchasing at the stores present inside the venue. The stores can be food stores, artist/team product franchise stores, other products (such as flags, T-shirts, boards, balloons) stores, etc. In one embodiment, monitoring the in-venue purchase of the user also indicates monitoring the location of the user to verify that the user is present inside the venue when making the purchase. At block 2004, it is identified whether the user has made the in-venue purchase. If the in-venue purchase has occurred, an NFT is assigned to the user, at NFT block 806. The NFT is assigned to encourage more purchases inside the venue by the user.

Moreover, at block 2004, when it is determined that the in-venue purchase did not occur, the venue management device(s) encourages the user to make more purchases inside the venue, at block 2008. For achieving this, at block 2010, the user is provided with promotional offers on their end-user devices. These promotional offers can be provided by the stores present inside the venue.

In one embodiment, the offers are transmitted to the user in real-time. For example, the stores can transmit offers such as "buy anything within the next 15 minutes and get an NFT". Such offers would encourage the user to rush to the store to buy something so that they can be rewarded with the NFT. In case the user makes an in-venue purchase, the process moves to block 2012 where it is confirmed whether the in-venue purchase has occurred. If the in-venue purchase has occurred, the NFT is assigned to the user profile (block 2006). In case the user still does not make the in-venue purchase, the process either ends at block 2014 or the user is provided with more promotional offers.

Figure 21:
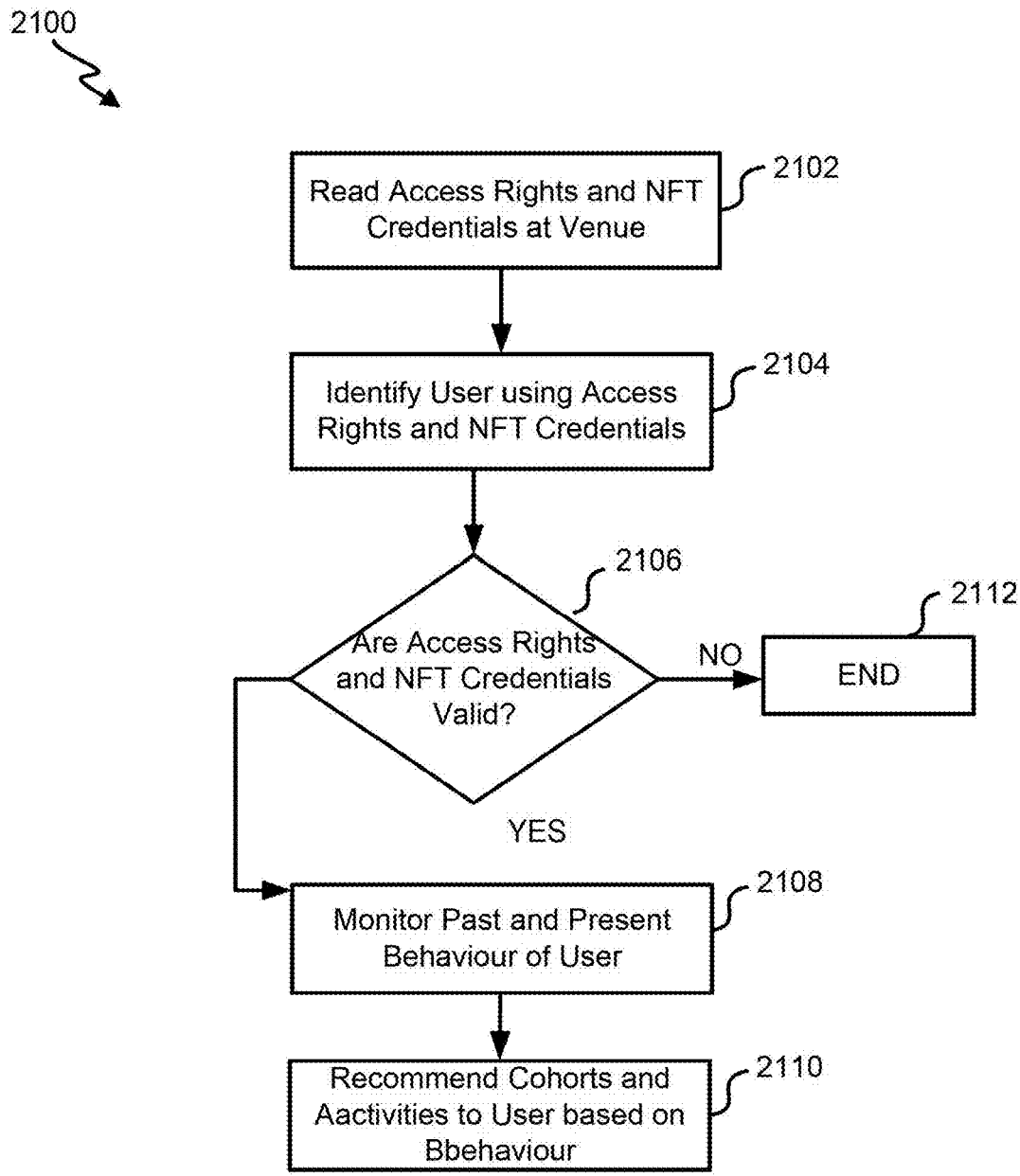
FIG. 21 illustrates an example embodiment of monitoring user behavior and group suggestions to the user according to another embodiment of the present disclosure.

Referring to FIG. 21, illustrates a flowchart of process 2100 for recommending activities to a user inside a venue. At blocks 2102 and 2104, access rights credentials and NFT assigned to the user while purchasing the access rights are read and identified at the entrance of the venue. At block 2106, if the access rights credentials and the NFT are found to be valid, process 2100 moves to block 2108 where the past and present behavior of the user is monitored. The behavior of the user can be monitored from the time NFT is assigned to the user. Based on the past and present behavior of the user, the user can be recommended with one or more activities, at block 2110. The behavior of the user can include events attended by the user, the type of seats assigned to the user while attending the event, favorite performers/artists of the user, etc. Future events can include recommendations to the user regarding future events, and future venues based on the past and present behavior of the user. At block 2106, if the access rights and NFT credentials are not valid, process 2100 ends at block 2112.

Figure 22:
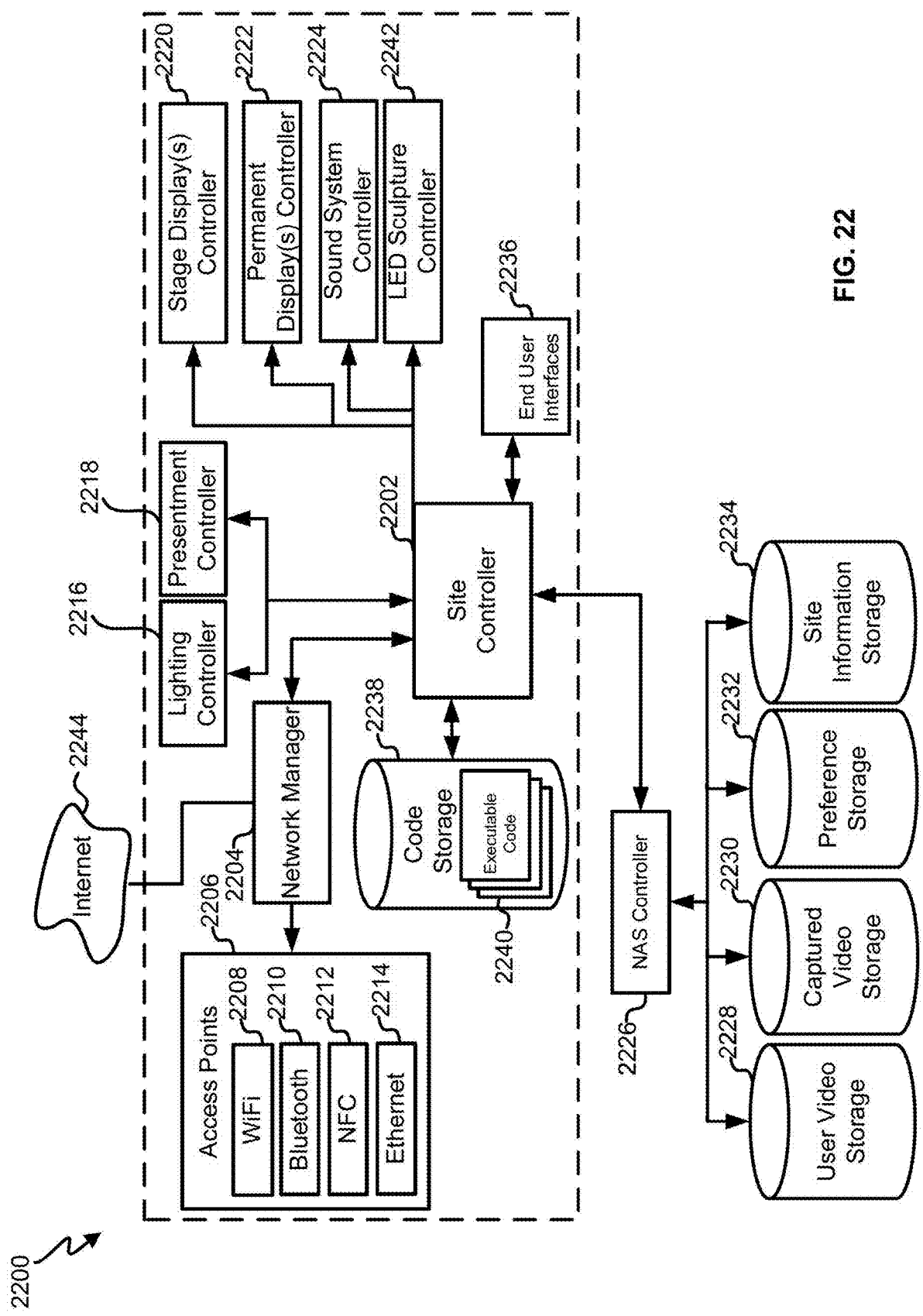
FIG. 22 illustrates a block diagram of a venue management device according to an embodiment of the present disclosure.

Referring to FIG. 22, illustrates a block diagram of the venue management device 2200. Embodiments of a site controller 2202 use a network manager 2204 to connect via access points 2206 (using e.g., a Wi-Fi 2208, Bluetooth 2210, a Near Field Technology (NFC) 2212, an Ethernet 2214, and/or other network connections) to other network components, such as site network and end-user device(s) (not shown herein and described in FIG. 24 as 2400). In some embodiments, the site controller 2202 controls aspects of an event location. A broad variety of location features can be controlled by different embodiments, including permanent lights (e.g., with a lighting controller 2216), stage lights (e.g., with presentment controller 2218), stage display screens (e.g., with stage display(s) controller 2220), permanent display screens (e.g., with permanent display(s) controller 2222), the location sound system (e.g., with the sound system controller 2224) and LED sculpture controller 2242.

A NAS controller 2226 is coupled to a user video storage 2228, a captured video storage 2230, a preference storage 2232, and a site information storage 2234. The captured video storage 2230 can receive, store, and provide user videos received from end-user device(s). In some embodiments, the site controller 2202 triggers the automatic capture of images, audio, and video from the end user device(s), such triggering being synchronized to activities in an event. Images captured by this and similar embodiments can be stored on both the capturing end user device(s) and the user video storage 2228. In an embodiment, the site controller 2202 can coordinate the transfer of information from the end-user device(s) to the NAS controller 2226 (e.g., captured media) with activities taking place during the event. When interacting with the end user device(s), some embodiments of the site controller 2202 can provide the end-user interfaces 2236 to enable different types of interaction. For example, as a part of engagement activities, the site controller 2202 can offer quizzes and other content to the devices. Additionally, for location determinations discussed herein, the site controller 2202 can supplement determined estimates with voluntarily provided information using the interface of the end-user interface 2236, stored in a storage that is not shown. The venue management device(s) 2200 can be connected to an internet 2244.

In some embodiments, to guide the performance of different activities, the site controller 2202 and/or other components can use executable code tangibly stored in code storage 2238 comprising executable code 2240. In some embodiments, the site information storage 2234 can provide information regarding the site, e.g., events, resource maps, attendee information, geographic location of destinations (e.g., concessions, bathrooms, exits, etc.), as well as 3D models of site features and structure.

In one embodiment, all the access rights related transactions are encrypted to save for them from any hacking and also use blockchain technology in order to make access rights sales temper proof. In other words, all access rights related transactions are recorded in a distributed ledger, and for every transaction the distributed ledger gets updated with inimitable values.

Figure 23:
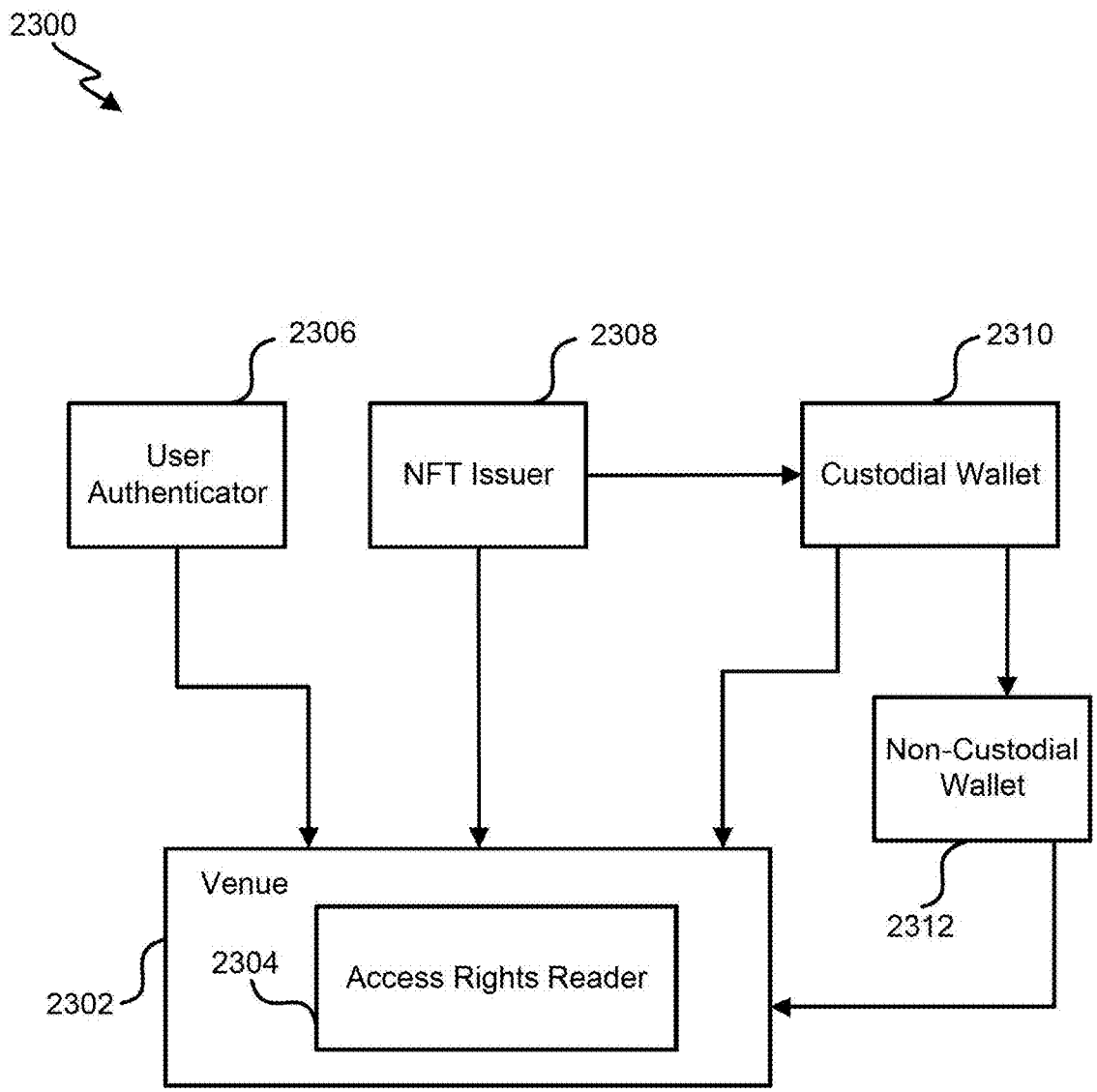
FIG. 23 illustrates a process flow inside a venue according to an embodiment of the present disclosure.

Referring to FIG. 23, illustrates process flow 2300. When a user enters venue 2302, an access rights reader 2304 present at the entrance of the venue scans the access rights available to the user. The access rights can be present on an application running on the end-user device available with the user. The access rights reader 2304 sends the details scanned from the access rights to a user authenticator 2306. The user authenticator 2306 verifies whether the user who bought the access rights and the user who is entering venue 2302 is the same. Along with user authentication, the user authenticator 2306 also makes use of the NFT issued to the user at the time of purchase of the access rights. Since the NFT is used to identify a true owner, it is easy to track the genuine owner of the access rights.

Once it is determined that the user who bought the access rights and the one who is trying to enter venue 2302 are the same, an NFT issuer 2308 assigns another NFT to the user as a token of incentive. The assigned NFT is primarily assigned in the custodial wallet 2310 and then transferred to the non-custodial wallet 2312 by the user. Finally, the NFT is stored in the non-custodial wallet 2312 available to the user. More NFTs are awarded to the user as the user interacts more inside Venue 2302. For example, the NFTs can be awarded to the user for making an in-venue purchase. The NFTs can also be traded between users. The user having the highest number of NFTs can be rewarded. Since each NFT has a value associated with it, the user is motivated to attend more and more events and collect more and more NFTs.

Figure 24:
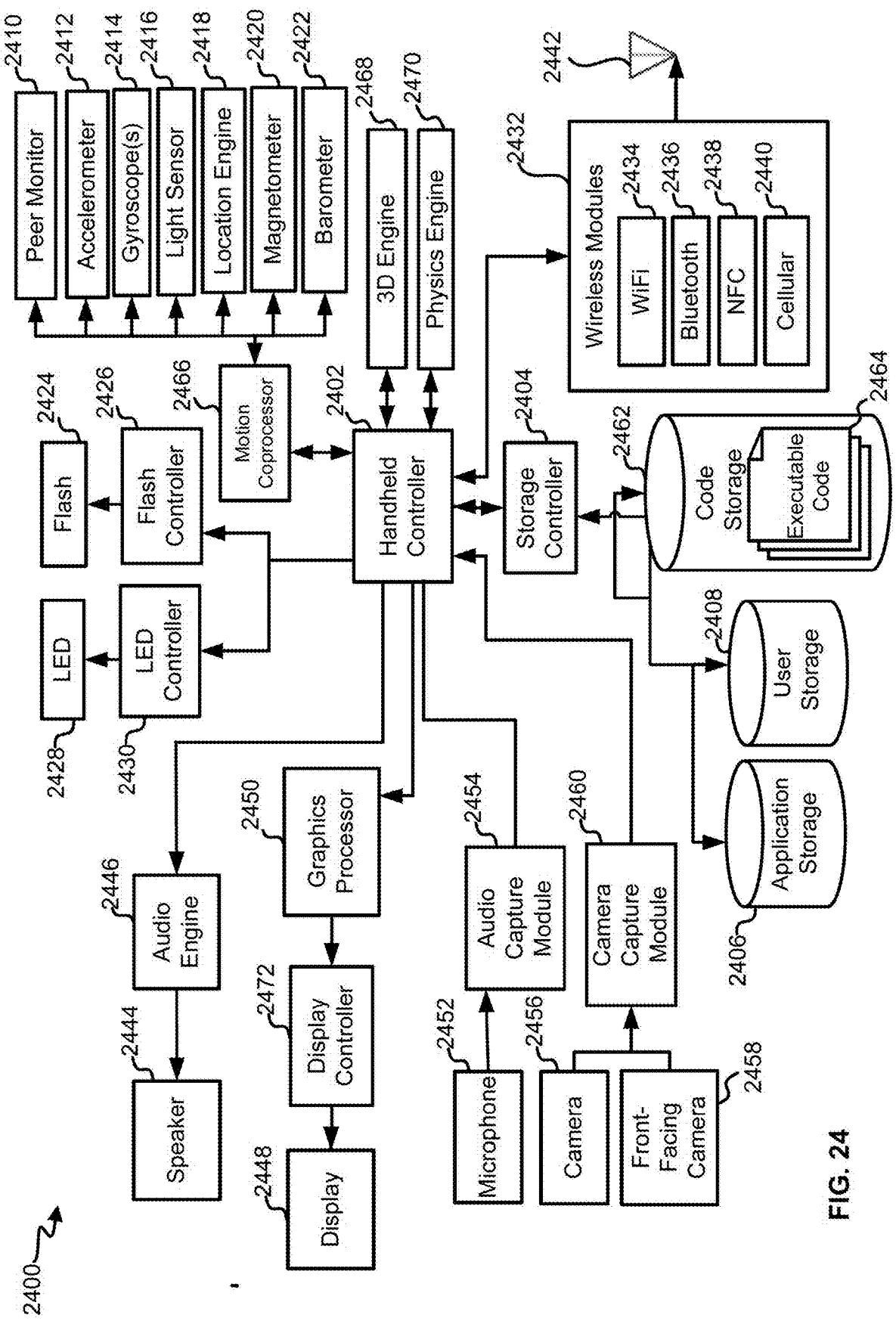
FIG. 24 illustrates a block diagram of an end-user device according to an embodiment of the present disclosure.

Referring to FIG. 24, illustrates a block diagram of the end-user device 2400. The end-user device 2400 includes a handheld controller 2402 that can be sized and shaped so as enable the controller and end-user device 2400 in a hand. The handheld controller 2402 can include one or more end user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a server, etc.), processing a received communication (e.g., to act in accordance with instruction in the communication, to generate a presentation based on data in the communication, or to generate a response communication that includes data requested in the received communication) and so on. In one embodiment, to guide the performance of different activities, the end-user device can use executable code tangibly stored in code storage 2462 comprising executable code 2464.

The handheld controller 2402 can communicate with a storage controller 2404 to facilitate local storage and/or retrieval of data. It will be appreciated if the handheld controller 2402 can further facilitate storage and/or retrieval of data at a remote source via generation of communications including the data (e.g., with a storage instruction) and/or requesting particular data.

The storage controller 2404 can be configured to write and/or read data from one or more data stores, such as application storage 2406 and/or user storage 2408. One or more data stores can include, for example, random access memory (RAM), dynamic random access memory (DRAM), read-only memory (ROM), flash-ROM, cache, storage chip, and/or removable memory. Application storage 2406 can include various types of application data for each of one or more applications loaded (e.g., downloaded or pre-installed) onto the end-user device. For example, one or more applications can include applications entailed for scanning the access rights at the entrance of the venue, the application running non-custodial wallets, and applications for other venue related purchases. Further, application data can include, for example, application code, settings, profile data, databases, session data, history, cookies, and/or cache data. User storage 2408 the can include, for example, files, documents, images, videos, voice recordings, and/or audio. It will be appreciated if the end-user device 2400 can also include other types of storage and/or stored data, such as code, files, and data for an operating system configured for execution on end-user device 2400.

The handheld controller 2402 can also receive and process (e.g., in accordance with code or instructions generated in correspondence to a particular application) data from one or more sensors and/or detection engines. One or more sensors and/or detection engines can be configured to, for example, detect the presence, intensity, and/or the identity of (for example) another device (e.g., a nearby device or device-detectable over a particular type of networks, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, network strength and/or network reliability). The sensors and detection engines include a peer monitor 2410, an accelerometer 2412, a gyroscope 2414, a light sensor 2416, a location engine 2418, a magnetometer 2420, and a barometer 2422. Each sensor and/or detection engine can be configured to collect a measurement or decide, for example, at routine intervals or times and/or upon receiving a corresponding request (e.g., from a processor executing an application code).

The peer monitor 2410 can monitor communications, networks, radio signals, short-range signals, etc., which can be received by a receiver of an end-user device 2400. The peer monitor 2410 can, for example, detect short-range communication from another device and/or use a network multicast or broadcast to request identification of nearby devices. Upon or while detecting another device, the peer monitor 2410 can determine an identifier, device type, associated user, network capabilities, operating system, and/or authorization associated with the device. The peer monitor 2410 can maintain and update a data structure to store a location, identifier, and/or characteristic of each of one or more nearby end-user devices 2400.

The accelerometer 2412 can be configured to detect the proper acceleration of end-user device 2400. The acceleration can include multiple components associated with various axes and/or a total acceleration. The gyroscope 2414 can be configured to detect one or more orientations (e.g., via detection of angular velocity) of end-user device 2400. The gyroscope 2414 can include, for example, one or more spinning wheels or discs, single- or multi-axis (e.g., three-axis) MEMS-based gyroscopes.

The light sensor 2416 can include, for example, a photosensor, such as a photodiode, active-pixel sensor, LED, photoresistor, or other component configured to detect a presence, intensity, and/or type of light. In some instances, one or more sensors and detection engines can include a motion detector, which can be configured to detect motion. Such motion detection can include processing data from one or more light sensors (e.g., performing a temporal and/or differential analysis).

The location engine 2418 can be configured to detect (e.g., estimate) the location of end-user device 2400. For example, the location engine 2418 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, the location engine 2418 can process signals from multiple sources and can estimate the location of end-user device 2400 using a triangulation technique. In some instances, the location engine 2418 can process a single signal and estimate its location as being the same as the location of the source of the signal.

The end-user device 2400 can include a flash 2424 and a flash controller 2426. The flash 2424 can include a light source, such as (for example), an LED, electronic flash, or high-speed flash. The flash controller 2426 can be configured to control when flash 2424 emits light. In some instances, the determination includes identifying an ambient light level (e.g., via data received from the light sensor 2416) and determining that the flash 2424 is to emit light in response to a picture- or movie-initiating input when the light level is below a defined threshold (e.g. when a setting is in an auto-flash mode). In some additional or alternative instances, the determination includes determining that the flash controller 2426 is, or is not, to emit light in accordance with a flash on/offsetting. When it is determined that the flash controller 2426 is to emit light, the flash controller 2426 can be configured to control the timing of the light to coincide, for example, with a time (or right before) at which a picture or video is taken.

The end-user device 2400 can also include an LED 2428 and an LED controller 2430. The LED controller 2430 can be configured to control when the LED 2428 emits light. The light emission can be indicative of an event, such as whether a message has been received, a request has been processed, an initial access time has passed, etc.

The flash controller 2426 can control whether the flash controller 2426 emits light by controlling a circuit to complete a circuit between a power source and the flash controller 2426 when the flash 2424 is to emit light. In some instances, the flash controller 2426 is wired to a shutter mechanism to synchronize light emission and collection of image or video data.

The end-user device 2400 can be configured to transmit and/or receive signals from other devices or systems (e.g., over one or more networks, such as network(s)). These signals can include wireless signals, and accordingly, the end-user device 2400 can include one or more wireless modules 2432 configured to appropriately facilitate the transmission or receipt of wireless signals of a particular type. The wireless modules 2432 can include a Wi-Fi module 2434, a Bluetooth module 2436, a near-field communication (NFC) module shown as NFC 2438, and/or a cellular module 2440. Each module can, for example, generate a signal (e.g., which can include transforming a signal generated by another component of the end-user device 2400 to conform to a particular protocol and/or to process a signal (e.g., which can include transforming a signal received from another device to conform with a protocol used by another component of end-user device 2400).

The Wi-Fi module 2434 can be configured to generate and/or process radio signals with a frequency between 2.4 gigahertz and 5 gigahertz. The Wi-Fi module 2434 can include a wireless network interface card that includes circuitry to facilitate communicating using a particular standard (e.g., physical and/or link-layer standard). The Bluetooth module 2436 can be configured to generate and/or process radio signals with a frequency between 2.4 gigahertz and 2.485 gigahertz. In some instances, Bluetooth module 2436 can be configured to generate and/or process Bluetooth low-energy (BLE or BTLE) signals with a frequency between 2.4 gigahertz and 2.485 gigahertz. The NFC 2438 can be configured to generate and/or process radio signals with a frequency of 13.56 megahertz. The NFC 2438 can include an inductor and/or can interact with one or more loop antennas. The cellular module 2440 can be configured to generate and/or process cellular signals at ultra-high frequencies (e.g., between 698 and 2690 megahertz). For example, the cellular module 2440 can be configured to generate uplink signals and/or to process received downlink signals.

The signals generated by the wireless modules 2432 can be transmitted to one or more other devices (or broadcast) by one or more antennas 2442. The signals processed by the wireless module 2432 can include those received by one or more antennas 2442. One or more antennas 2442 can include, for example, a monopole antenna, helical antenna, antenna, Planar Inverted-F Antenna (PIFA), modified PIFA, and/or one or more loop antennae.

The end-user device 2400 can include various input and output components. An output component can be configured to present output. For example, speaker 2444 can be configured to present an audio output by converting an electrical signal into an audio signal. An audio engine 2446 can affect particular audio characteristics, such as volume, event-to-audio-signal mapping, and/or whether an audio signal is to be avoided due to a silencing mode (e.g., a vibrate or do-not-disturb mode set at the device).

Further, a display 2448 is provided with a display controller 2472 and can be configured to present a visual output by converting an electrical signal into a light signal. The display 2448 can include multiple pixels, each of which can be individually controllable, such that the intensity and/or color of each pixel can be independently controlled. The display 2448 can include, for example, an LED- or LCD-based display.

A graphics processor 2450 can determine a mapping of electronic image data to pixel variables on a screen of the end-user device 2400. It can further adjust lighting, texture, and color characteristics in accordance with, for example, user settings.

In some instances, display 2448 is a touchscreen display (e.g., a resistive or capacitive touchscreen) and is thus both an input and an output component. A graphics processor 2450 can be configured to detect whether, where and/or how (e.g., a force of) a user touched display 2448. The determination can be made based on an analysis of capacitive or resistive data.

An input component can be configured to receive input from a user that can be translated into data. For example, end-user device 2400 can include a microphone 2452 that can capture audio data and transform the audio signals into electrical signals. An audio capture module 2454 can determine, for example, when an audio signal is to be collected and/or any filter, equalization, noise gate, compression, and/or clipper that is to be applied to the signal.

The end-user device 2400 can further include one or more cameras 2456, and 2458, each of which can be configured to capture visual data (e.g., at a given time or across an extended period) and convert the visual data into electrical data (e.g., electronic image or video data). In some instances, end-user device 2400 includes multiple cameras, at least two of which are directed in different and/or substantially opposite directions. For example, end-user device 2400 can include a rear-facing camera 2456 and a front-facing camera 2458.

A camera capture module 2460 can control, for example, when a visual stimulus is to be collected (e.g., by controlling a shutter), a duration for which a visual stimulus is to be collected (e.g., a time that a shutter is to remain open for a picture taking, which can depend on a setting or ambient light levels; and/or a time that a shutter is to remain open for a video taking, which can depend on inputs), a zoom, a focus setting, and so on. When end-user device 2400 includes multiple cameras, camera capture module 2460 can further determine which camera(s) is to collect image data (e.g., based on a setting). In some embodiments, components are included that assist with the processing and utilization of sensor data. Motion coprocessor 2466, 3D engine 2468, and physics engine 2470 can all process sensor data, and also perform tasks of graphics rendering related to graphics processor 2450.

The end-user device 2400 further includes a non-custodial wallet as explained above. The non-custodial wallet can store a list of NFTs owned by the user. The NFTs can be used to authenticate a user when the user is entering the venue, making a purchase inside the venue, providing incentives to users to attend an event, etc.

In one embodiment, the system and method are adapted for providing additional priority/discounts to group members based on their booking in the organizer's suggested hotels and parking. The system incentivizes group members to book recommended accommodations and parking options that offer additional perks such as proximity to celebrities or players attending the event.

As described in further detail below, in some instances, the system includes a database of recommended hotels and parking options that the organizer has suggested to group members. The system also includes a prioritization algorithm that assigns priority levels to each recommended hotel and parking option based on proximity to celebrities or players, availability, and other factors. The system also includes a communication module that sends personalized messages to group members, informing them of the additional priority/discounts they can receive by booking recommended accommodations and parking options.

One exemplary embodiment describes a scenario in which a sports team is organizing a trip for its fans to attend an away game. The team has suggested hotels and parking options to its fans for the duration of the trip. For example, the organizer creates a database of recommended hotels and parking options based on proximity to the stadium, availability, and other factors. The database includes a prioritization algorithm that assigns priority levels to each recommended hotel and parking option based on proximity to the stadium and other factors. The system sends personalized messages to group members, informing them of the additional priority/discounts they can receive by booking recommended accommodations and parking options. The messages also include information about the proximity of the recommended accommodations and parking options to the stadium and any celebrities or players attending the game.

Moreover, group members who book recommended accommodations and parking options receive additional priority/discounts such as early check-in, late check-out, free parking, or access to exclusive events. The priority/discounts are based on the priority level of the booked accommodation or parking option.

In addition, the system continuously updates the prioritization algorithm based on feedback from group members, availability of recommended accommodations and parking options, and other factors.

In various embodiments, the system incentivizes group members to book recommended accommodations and parking options, which ultimately leads to a better overall experience for the group. In addition, the system allows organizers to prioritize recommended accommodations and parking options based on proximity to celebrities or players and other factors.

In one exemplary embodiment, the method and system are adapted for identifying genuine fans and deprioritizing robot users in a group formed based on common attributes. The system includes an index value calculation module that calculates an index value for individual member in the group based on multiple parameters, including but not limited to, user activity, social media presence, and purchase history.

As yet another example, the system then identifies genuine fans by comparing their index value with a dynamically calculated threshold value. Genuine fans are given priority in the booking process, and their bookings are expedited and discounted as a reward for their loyalty.

Furthermore, robot users are also identified by comparing their index value with the dynamically calculated threshold value. Robot users are deprioritized in the booking process to ensure that genuine fans have the best chances of getting their bookings confirmed.

An exemplary embodiment illustrates a computer-implemented system that collects data on user activity, social media presence, and purchase history. The system then uses machine learning algorithms to analyze the data and calculate an index value for individual member of the group.

The system applies the dynamically calculated threshold value to the index values and identifies genuine fans and robot users accordingly. The system also includes a booking module that expedites/discounts bookings for genuine fans and deprioritizes robot users during the booking process.

As illustrated, the method and system are adapted for identifying genuine fans and deprioritizing robot users in a group based on common attributes, thereby improving the overall booking experience for genuine fans and preventing robot users from dominating the booking process.

In another exemplary embodiment, the system and method for updating the overall group score and individual score based on the addition or removal of group members or celebrities, as per their index value are disclosed. The system uses a computer-implemented algorithm to calculate and update the scores dynamically, providing a real-time assessment of the group's performance.

The exemplary embodiment represents a database that stores individual index values for individual member of the group and celebrities. The index value is a measure of the individual's popularity, influence, or expertise in a particular field. The system updates the overall group score by aggregating the individual index values of all members and celebrities in the group. The individual scores are updated based on changes in the individual index values, such as an increase or decrease in popularity or expertise.

The system uses an automated process to add or remove members from the group based on predefined rules. The rules can be based on various criteria, such as the individual's index value, the relevance of their expertise to the group's objective, or their availability. The system also allows the manual addition or removal of members by authorized users.

The system provides a user interface that displays the updated scores in real time, allowing the users to monitor the group's performance and make informed decisions. The interface also provides features for generating reports, analyzing trends, and comparing scores with other groups or competitors.

In one exemplary embodiment, the system and method offer a real-time assessment of the group's performance, enabling users to make informed decisions and improve their outcomes.

One exemplary embodiment discloses a system and method for facilitating the transfer of access right among members of a fan club group. The system allows users to identify new users to whom a surrendered access rights will be offered, and these new users are added to the group. Additionally, the system prompts users to join a fan club group and allows for the transfer of access right within the same group.

In one embodiment, the system includes a user interface that allows users to surrender their access right if they are unable to attend an event. The system then identifies potential users who may be interested in the access rights and prompts them to join the fan club group. The system also allows for the transfer of access right within the same group, enabling users to purchase or exchange access right with other members.

In another embodiment, the system includes a notification feature that alerts users when a access rights becomes available within the fan club group. This feature allows users to quickly and easily acquire access right for events they are interested in attending.

In one exemplary embodiment, the system and method are adapted for offering surrendered event access right to users based on their preferences. The system collects event preferences from users including their preferred events, location, time, etc. When a access rights is surrendered, the system matches the event details with the preferences of the users in its database. If a match is found, the system offers the surrendered access rights to the user.

As another exemplary embodiment, a user registers with the system by providing their event preferences such as preferred events, location, time, etc. The system collects this information and stores it in a database. When the access rights are surrendered, the system retrieves the event details such as event name, location, date, time, etc., and compares it with the user preferences in the database. In case there is a match, the system sends an offer notification to the user with details of the surrendered access rights. The user can accept or decline the offer. If the user accepts the offer, the system sends the access rights to the user via email or mobile app. The system can also send reminders to the user to claim the access rights before the event starts.

In another embodiment, the system can prioritize the offer based on the user's preferences. For example, if a user's preferred event is a concert by a particular artist, and a access rights for that concert is surrendered, the system will prioritize offering the access rights to that user over others.

In one exemplary embodiment, one general aspect includes a system for access rights booking and enabling group check-in. The system also includes a processor configured to identify the availability of access right for an event. The system also includes a receiving module configured to receive a request for access rights booking from a plurality of users. The system also includes a booking module configured to confirm access rights booking. The system also includes a grouping module configured to introduce a plurality of groups based on user attributes. The system also includes a user interface module configured to receive input from at least one user for joining at least one group. The system also includes a triggering module configured to trigger check-in by at least one group member. The system also includes a check-in module configured to enable all the group members to check in for the event simultaneously. Other embodiments of this aspect include corresponding computer systems, apparatus, and computer programs recorded on one or more computer storage devices, each configured to perform the actions of the methods.

In one another exemplary embodiment, the system may include an indexing module for determining an increase in group index value after adding the user in a specified group; and a determination module for determining that a newly added user is a genuine user based on a determination that the group index value is more than an initial group index value.

The processor is further configured to determine that the existing user is the genuine user or not based on a comparison of index value of the existing user with a second threshold value. The processor is further configured to add the genuine users to the group, add bonus points to the group index value, recalculate group index value, and enable priority booking features for entire group members.

In one another exemplary embodiment, a server configured to store group information and synchronize the group index value among the plurality of devices. Implementations of the described techniques may include hardware, a method or process, or computer software on a computer-accessible medium.

In one another exemplary embodiment, one general aspect includes a method for access rights booking and enabling group check-in. The method also includes identifying availability of access right for an event, receiving a request for access rights booking from a plurality of users, confirming access rights booking, introducing a plurality of groups based on user attributes. The method also includes receiving input from at least one user for joining at least one group via a user interface, triggering check-in by at least one group member, enabling all the group members to check-in for the event simultaneously. Other embodiments of this aspect include corresponding computer systems, apparatus, and computer programs recorded on one or more computer storage devices, each configured to perform the actions of the methods.

In one another exemplary embodiment, the system may include: a monitoring module for monitoring the group index value after adding the user in the specified group; and a detection module for detecting that the newly added user is a broker or fake user if the group index value decreases after adding the user in the specified group.

In one another exemplary embodiment, one general aspect includes a system that includes a memory for storing cohort index values associated with groups of users and a predefined threshold value. The system also includes a processor for comparing the group index value of a group associated with a user to the predefined threshold value, and if the group index value is greater than the threshold value, enabling a smart queue for all group members associated with the group. The system also includes a access rights booking module for facilitating prioritized access rights booking and check-in for the group members associated with the enabled smart queue at the event. The system also includes a user interface for presenting access rights availability, cohort index values, and smart queue status to users.

In one another exemplary embodiment, the method may include monitoring the group index value after adding the user in the specified group; and detecting that the newly added user is a broker or fake user if the group index value decreases after adding the user in the specified group.

In one another exemplary embodiment, the method also includes identifying the availability of access right for an event, determining the group index value of a group associated with a user, comparing the group index value with a predefined threshold value, enabling a smart queue for all members of the group associated with the user if the group index value is greater than the threshold value, where the smart queue feature enables prioritized access rights booking and check-in simultaneously for the event.

In one another exemplary embodiment, the device may include an indexing module for determining an increase in group index value after adding the user in the specified group; and a determination module for determining that the newly added user is a genuine user based on a determination that the group index value is more than the initial group index value.

In one another exemplary embodiment, the device may include a monitoring module for monitoring the group index value after adding the user in the specified group; and a detection module for detecting that the newly added user is a broker or fake user if the group index value decreases after adding the user in the specified group.

In one another exemplary embodiment, the system also includes a access rights availability module configured to identify the availability of access right for an event. The system also includes a group index value comparison module configured to compare the group index value of a group associated with a user with a predefined threshold value. The system also includes a smart queue module configured to enable prioritized access rights booking and check-in for all members of the group associated with the user if the group index value is greater than the threshold value.

In one another exemplary embodiment, a device for enabling group check-in to users. The device also includes a user interface for receiving user input. The device also includes a processor configured to identify user attributes, including index value, interest, location, etc., and to populate a plurality of groups based on the user attributes. The device also includes a database storing user information for authentication. The device also includes a verification module configured to compare the user attributes with information stored in the database to verify the authenticity of a user associated with the device. The device also includes a membership allocation module configured to allocate membership to the user in a specified group based on successful authentication and to indicate the user as a robot user and block membership in the specified group based on unsuccessful authentication.

In one another exemplary embodiment, a method for enabling group check-in to users. The method also includes identifying user attributes, including index value, interest, location, etc. The method also includes populating a plurality of groups based on the user attributes on a user interface of a device. The method also includes receiving an input on the user interface for joining at least one group. The method also includes verifying authenticity of a user associated with the device based on comparing the user attributes with information stored in a database. The method also includes allocating membership to the user in the specified group based on successful authentication. The method also includes indicating the user as a robot user and blocking membership in the specified group based on unsuccessful authentication.

In one another exemplary embodiment, the system also includes a user interface for receiving an input for joining at least one group. The system also includes a database for storing user information, including user attributes such as index value, interest, and location. The system also includes a verification module for authenticating a user associated with a device based on comparing the user attributes with the information stored in the database. The system also includes an allocation module for allocating membership to the user in the specified group based on successful authentication. The system also includes a blocking module for indicating the user as a robot user and blocking membership in the specified group based on unsuccessful authentication.

In one another exemplary embodiment, the method also includes receiving an input on a user interface for joining at least one group. The method also includes verifying authenticity of a user associated with a device based on comparing user attributes with information stored in a database. The method also includes allocating membership to the user in the specified group based on successful authentication. The method also includes indicating the user as a robot user and blocking membership in the specified group based on unsuccessful authentication. The method also includes determining an increase in group index value after adding the user in the specified group. The method also includes determining that the newly added user is a genuine user based on a determination that the group index value is more than the initial group index value.

In one another exemplary embodiment, the device also includes a user interface for receiving an input for joining at least one group. The device also includes a database for storing user information, including user attributes such as index value, interest, and location. The device also includes a verification module for authenticating a user associated with a device based on comparing the user attributes with the information stored in the database. The device also includes an allocation module for allocating membership to the user in the specified group based on successful authentication. The device also includes a blocking module for indicating the user as a robot user and blocking membership in the specified group based on unsuccessful authentication.

In one another exemplary embodiment, the device also includes a user interface configured to receive an input for joining at least one group. The device also includes a processor configured to determine whether the input is raised by a new user, or an existing user based on a comparison of user attributes with information stored in a database. The device also includes if the input is raised by a new user, prompt a quiz on the new user device that is time-bound and determine that the new user is a genuine user based on a comparison of quiz score with a threshold value. The device also includes if the input is raised by the existing user, compare index value of the existing user with a second threshold value and determine that the existing user is the genuine user or not based on the comparison. The device also includes add genuine users to the group. The device also includes add bonus points to the group index value. The device also includes recalculate group index value. The device also includes enable priority booking features for entire group members or more computer storage devices, each configured to perform the actions of the methods.

In one another exemplary embodiment, the system also includes a user interface configured to receive an input for joining at least one group. The system also includes a processor configured to determine whether the input is raised by a new user or an existing user based on a comparison of user attributes with information stored in a database. The system also includes if the input is raised by a new user, prompt a quiz on the new user device that is time-bound and determine that the new user is a genuine user based on a comparison of quiz score with a threshold value. The system also includes if the input is raised by the existing user, compare index value of the existing user with a second threshold value and determine that the existing user is the genuine user or not based on the comparison. The system also includes add genuine users to the group. The system also includes add bonus points to the group index value. The system also includes recalculate group index value. The system also includes enable priority booking features for entire group members.

In one another exemplary embodiment, the method also includes receiving an input for joining at least one group via a user interface. The method also includes determining whether the input is raised by a new user, or an existing user based on a comparison of user attributes with information stored in a database. The method also includes if the input is raised by a new user, prompting a quiz on the new user device that is time-bound and determining that the new user is a genuine user based on a comparison of quiz score with a threshold value. The method also includes if the input is raised by the existing user, comparing index value of the existing user with a second threshold value and determining that the existing user is the genuine user or not based on the comparison. The method also includes adding genuine users to the group. The method also includes adding bonus points to the group index value. The method also includes recalculating group index value. The method also includes enabling priority booking features for entire group members.

In one another exemplary embodiment, the device also includes a user interface configured to receive an input for joining at least one group. The device also includes a database storing information of existing users. The device also includes a processor configured to determine whether the input is raised by a new user or an existing user by comparing user attributes with information stored in the database. The device also includes where, in case the input is raised by the new user, the processor is further configured to prompt a quiz on the new user device, and determine that the new user is a genuine user based on a comparison of quiz score with a threshold value.

In one another exemplary embodiment, the method also includes receiving an input on a user interface for joining at least one group. The method also includes determining whether the input is raised by a new user or an existing user by comparing user attributes with information stored in a database. The method also includes prompting a quiz on a new user device and determining that the new user is a genuine user based on a comparison of quiz score with a threshold value, in case the input is raised by the new user. The method also includes comparing index value of the existing user with a second threshold value, and determining that the existing user is the genuine user or not based on the comparison, in case the input is raised by the existing user. The method also includes adding the genuine users to the group, adding bonus points to the group index value, recalculating group index value, and enabling priority booking features for entire group members. The method also includes allocating NFT based on successful enrolment in the groups. The method also includes online group check in with preferred hotel, parking, and providing discounts. The method also includes group members are provided with additional priority/discounts based on their booking in organizer's suggested hotels, parking (e.g. close proximity with their celebrities or players). The method also includes online group check in with genuine fans having common attributes. The method also includes group formed based on common attributes and after formation of group. the system further identifies genuine fans based on a comparison of their index value with a threshold value and their booking is expedited/discounted. in addition, robot users are also identified based on a comparison of index value with the threshold value (threshold value is calculated based on multiple parameters and always calculates a dynamic value). Robot users are deprioritized by booking preferences.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine-readable mediums for storing information. The term "machine-readable medium" includes but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMS, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A system providing cohort affinity grouping for access control at a venue, comprising:
   at least one processor configured to:
   receive a request for access rights to a resource from a first user device associated with a first user;
   verify authenticity of the first user based on a comparison of a first user's credentials with pre-stored credentials in a database;
   assign the access rights to the first user based on the verification of the first user;
   identify a second user and a third user by accessing social graph data of the first user, wherein the social graph data is calculated based on multiple parameters including past attendance information, social media presence, location, interaction with other groups, and/or visibility at live events, wherein the second user is associated with a second user device and the third user is associated with a third user device;
   determine a correlation value between the social graph data of the second user and the third user with the social graph data of the first user, wherein the social graph data of the second user and the third user is calculated based on past attendance information, social media presence, location, interaction with other groups, and/or visibility at live events;
   control the first user device, the second user device, and the third user device to display a plurality of cohorts associated with the resource, wherein the plurality of cohorts are populated based on a determination that the correlation value is above a threshold;
   receive a selection for joining at least one cohort of the plurality of cohorts from the first user device, the second user device, and the third user device;
   transmit availability of access rights to the second user device and the third user device based on the selection of the at least one cohort;
   assign the access rights to the second user and the third user based on confirmation of the at least one cohort and based on receiving a request for access rights from the second user device and the third user device;
   enable a smart queue for members of the at least one cohort, and trigger a notification of availability for check-in inside the venue based on a predefined interval of time, wherein the notification is displayed on the first user device, the second user device, and the third user device;
   receive input from any member of the at least one cohort to trigger a check-in that results in triggering check-in for all the members of the at least one cohort; and
   assign a queue number to the members of the at least one cohort based on the trigger to check-in, and transmit a notification of seating arrangement to the user devices, wherein the notification includes seating information of the members of the cohort in proximity to one another.

2. The system of claim 1, wherein the processor is further configured to verify the authenticity of the first user by comparing user attributes, the user attributes includes an index value, interest, and location, with information stored in a database.

3. The system of claim 1, further comprising a memory configured to store results of the verification and allocate membership to the first user in a specified cohort based on successful authentication, wherein successful authentication is determined by a machine learning model predicting a high likelihood of authenticity.

4. The system of claim 1, wherein the processor is further configured to determine an increase in a cohort index value after adding the first user to the at least one cohort, wherein the cohort index value is calculated using a weighted sum of individual index values of all cohort members, with weights determined by a machine learning model.

5. The system of claim 4, wherein the processor is further configured to periodically re-evaluate the cohort index value using a machine learning model to adjust weights to determine eligibility of the members of the cohort for priority booking.

6. The system of claim 4, wherein the processor is further configured to determine that the first user is a genuine user based on the cohort index value being greater than an initial cohort index value.

7. The system of claim 6, wherein the processor is further configured to enable priority booking features for all cohort members based on the determination that the first user is a genuine user, wherein the priority booking features include access to an expedited check-in process and early access to event resources.

8. The system of claim 1, wherein the processor is further configured to cross-reference user attributes with historical data stored in the database and update a machine learning model with new data.

9. The system of claim 1, wherein the processor is further configured to:
   compare the social graph data of the first user to a predefined threshold value;
   direct the first user to wait in a booking lobby if the social graph data is less than the threshold value; and
   enable a smart queue for the first user for booking access rights if the social graph data is greater than or equal to the threshold value.

10. The system of claim 1, wherein the predefined interval of time indicates a check-in window during which the member of the at least one cohort initiate check-in for all cohort members upon activation.

11. A method for providing cohort affinity grouping for access control at a venue, comprising:
- receiving a request for access rights to a resource from a first user device associated with a first user;
- verifying authenticity of the first user based on a comparison of a first user's credentials with pre-stored credentials in a database;
- assigning the access rights to the first user based on the verification of the first user;
- identifying a second user and a third user by accessing social graph data of the first user, wherein the social graph data is calculated based on multiple parameters including past attendance information, social media presence, location, interaction with other groups, and/or visibility at live events, wherein the second user is associated with a second user device and the third user is associated with a third user device;
- determining a correlation value between the social graph data of the second user and the third user with the social graph data of the first user, wherein the social graph data of the second user and the third user is calculated based on past attendance information, social media presence, location, interaction with other groups, and/or visibility at live events;
- controlling the first user device, a second user device, and the third user device to display a plurality of cohorts associated with the resource, wherein the plurality of cohorts are populated based on a determination that the correlation value is above a threshold;
- receiving a selection for joining at least one cohort of the plurality of cohorts from the first user device, the second user device, and the third user device;
- transmitting availability of access rights to the second user device and the third user device based on the selection of the at least one cohort;
- assigning the access rights to the second user and the third user based on confirmation of the at least one cohort and based on receiving a request for access rights from the second user device and the third user device;
- enabling a smart queue for members of the at least one cohort, and triggering a notification of availability for check-in inside the venue based on a predefined interval of time, wherein the notification is displayed on the first user device, the second user device, and the third user device;
- receiving input from any member of the at least one cohort to trigger a check-in that results in triggering check-in for all the members of the at least one cohort; and
- assigning a queue number to the members of the at least one cohort based on the trigger to check-in, and transmitting a notification of seating arrangement to the user devices, wherein the notification includes seating information of the members of the cohort in proximity to one another.

12. A method according to claim 11, further comprising verifying the authenticity of the first user by comparing user attributes, including an index value, interest, and location, with information stored in a database.

13. A method according to claim 11, further comprising storing results of the verification and allocating membership to the first user in a specified cohort based on successful authentication, wherein successful authentication is determined by a machine learning model predicting a high likelihood of authenticity.

14. A method according to claim 11, further comprising determining an increase in a cohort index value after adding the first user to the at least one cohort, wherein the cohort index value is calculated using a weighted sum of individual index values of all cohort members, with weights determined by a machine learning model.

15. A method according to claim 14, further comprising determining that the first user is a genuine user based on the cohort index value being greater than an initial cohort index value.

16. A method according to claim 11, further comprising utilizing a machine learning model trained on historical user data to predict a likelihood of authenticity based on the user attributes compared with the information stored in the database.

17. A method according to claim 11, further comprising enabling priority booking features for all cohort members based on the determination that the first user is a genuine user, wherein the priority booking features include access to an expedited check-in process and early access to event resources.

18. A method according to claim 11, further comprising cross-referencing user attributes with historical data stored in the database and updating a machine learning model with new data.

19. A method according to claim 11, further comprising comparing the social graph data of the first user to a predefined threshold value; directing the first user to wait in a booking lobby if the social graph data is less than the threshold value; and enabling a smart queue for the first user for booking access rights if the social graph data is greater than or equal to the threshold value.

20. A non-transitory computer-readable medium containing instructions that, when executed by a processor, cause the processor to perform a method for providing cohort affinity grouping for access control at a venue using a machine learning model, the method comprising:
- receiving a request for access rights to a resource from a first user device associated with a first user;
- verifying authenticity of the first user based on a comparison of a first user's credentials with pre-stored credentials in a database;
- assigning the access rights to the first user based on the verification of the first user;
- identifying a second user and a third user by accessing social graph data of the first user, wherein the social graph data is calculated based on multiple parameters including past attendance information, social media presence, location, interaction with other groups, and/or visibility at live events, wherein the second user is associated with a second user device and the third user is associated with a third user device;
- determining a correlation value between the social graph data of the second user and the third user with the social graph data of the first user, wherein the social graph data of the second user and the third user is calculated based on past attendance information, social media presence, location, interaction with other groups, and/or visibility at live events;
- controlling the first user device, the second user device, and the third user device to display a plurality of cohorts associated with the resource, wherein the plurality of cohorts are populated based on a determination that the correlation value is above a threshold;
- receiving a selection for joining at least one cohort of the plurality of cohorts from the first user device, the second user device, and the third user device;

transmitting availability of access rights to the second user device and the third user device based on the selection of the at least one cohort;

assigning the access rights to the second user and the third user based on confirmation of the at least one cohort and based on receiving a request for access rights from the second user device and the third user device;

enabling a smart queue for members of the at least one cohort, and triggering a notification of availability for check-in inside the venue based on a predefined interval of time, wherein the notification is displayed on the first user device, the second user device, and the third user device;

receiving input from any member of the at least one cohort to trigger a check-in that results in triggering check-in for all the members of the at least one cohort; and assigning a queue number to the members of the at least one cohort based on the trigger to check-in, and transmitting a notification of seating arrangement to the user devices, wherein the notification includes seating information of the members of the cohort in proximity to one another.

\* \* \* \* \*